US012160433B1

United States Patent
Krishnamoorthy et al.

(10) Patent No.: US 12,160,433 B1
(45) Date of Patent: Dec. 3, 2024

(54) DEVICE-TO-ACCOUNT ANOMALY DETECTION

(71) Applicant: Amazon Technologies, Inc., Seattle, WA (US)

(72) Inventors: Venkatesh Krishnamoorthy, Bothell, WA (US); Delin Davis, Kirkland, WA (US); Fred Torok, Mercer Island, WA (US); Ribhav Agarwal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 386 days.

(21) Appl. No.: 17/231,536

(22) Filed: Apr. 15, 2021

(51) Int. Cl.
*H04L 29/06* (2006.01)
*H04L 9/40* (2022.01)
*H04L 43/16* (2022.01)

(52) U.S. Cl.
CPC .......... *H04L 63/1425* (2013.01); *H04L 43/16* (2013.01)

(58) Field of Classification Search
CPC .... H04L 63/1425; H04L 43/16; H04L 9/0866
See application file for complete search history.

(56) References Cited

U.S. PATENT DOCUMENTS

| | | | | |
|---|---|---|---|---|
| 7,369,506 B1 * | 5/2008 | Croak | ...................... | H04B 3/46 370/242 |
| 7,523,016 B1 * | 4/2009 | Surdulescu | ......... | H04L 63/1416 702/185 |
| 8,103,769 B1 * | 1/2012 | Weiser | ................ | H04L 43/0876 709/225 |
| 8,539,567 B1 * | 9/2013 | Logue | ..................... | H04L 63/08 709/227 |
| 9,148,424 B1 * | 9/2015 | Yang | ..................... | H04L 63/083 |
| 9,516,053 B1 * | 12/2016 | Muddu | ............... | G06F 16/9024 |
| 9,734,035 B1 * | 8/2017 | Hotchkies | ........... | G06F 11/3079 |
| 9,824,207 B1 * | 11/2017 | Kane-Parry | ............. | G06F 21/46 |
| 9,900,742 B1 * | 2/2018 | Thoresen | .............. | H04W 4/021 |
| 9,904,587 B1 * | 2/2018 | Potlapally | ............. | G06F 11/079 |
| 10,031,799 B1 * | 7/2018 | Young | ................... | G06F 11/076 |
| 10,108,791 B1 * | 10/2018 | Masterman | ........... | G06F 21/316 |

(Continued)

FOREIGN PATENT DOCUMENTS

WO   WO-2021086127 A1 *   5/2021   ............. G10L 15/22

OTHER PUBLICATIONS

Innovation Q Plus NPL Search (Year: 2023).*

(Continued)

*Primary Examiner* — Samson B Lemma
*Assistant Examiner* — Richard W Cruz-Franqui
(74) *Attorney, Agent, or Firm* — Lee & Hayes, P.C.

(57) ABSTRACT

Systems and methods for device-to-account anomaly detection are disclosed. For example, device information associated with user account data is queried from a user registry and from an external system. The device information from both sources is hashed or otherwise formatted and compared to determine whether a dissimilarity is present. A difference value may be generated and utilized to determine whether an anomaly is present for device-to-account associations as between the user registry and the external system. Utilizing the difference value and/or historical difference values associated with the external system, one or more actions for correcting the anomaly may be selected and performed.

20 Claims, 15 Drawing Sheets

(56) References Cited

U.S. PATENT DOCUMENTS

| | | | |
|---|---|---|---|
| 10,158,658 B1* | 12/2018 | Sharifi Mehr | H04L 63/1425 |
| 10,164,993 B2* | 12/2018 | Warman | H04L 63/145 |
| 10,181,985 B1* | 1/2019 | Passaglia | H04L 43/04 |
| 10,311,397 B1* | 6/2019 | Saran | G06Q 10/087 |
| 10,341,374 B1* | 7/2019 | Sadaghiani | G06F 18/217 |
| 10,397,013 B1* | 8/2019 | Hill | H04L 12/281 |
| 10,397,236 B1* | 8/2019 | Chadha | G06F 11/3476 |
| 10,409,662 B1* | 9/2019 | Young | G06F 11/079 |
| 10,432,605 B1* | 10/2019 | Lester | G06F 21/552 |
| 10,445,167 B1* | 10/2019 | Young | G06F 11/0709 |
| 10,482,464 B1* | 11/2019 | Dietrich | G06Q 20/4016 |
| 10,542,021 B1* | 1/2020 | Mehr | H04L 63/1416 |
| 10,560,365 B1* | 2/2020 | Losito | H04L 43/08 |
| 10,581,886 B1* | 3/2020 | Sharifi Mehr | H04L 63/1441 |
| 10,616,078 B1* | 4/2020 | Thomas | G06F 11/3495 |
| 10,616,314 B1* | 4/2020 | Plenderleith | H04L 67/1027 |
| 10,621,622 B1* | 4/2020 | Kondal | G06Q 30/0269 |
| 10,623,246 B1* | 4/2020 | Iyer | H04L 12/2832 |
| 10,623,429 B1* | 4/2020 | Vines | H04L 63/1458 |
| 10,630,649 B2* | 4/2020 | Gould | H04L 12/4633 |
| 11,188,861 B1* | 11/2021 | Johnson | G06Q 10/0635 |
| 11,310,243 B2* | 4/2022 | Gous | H04W 12/084 |
| 11,356,387 B1* | 6/2022 | Shateri | H04L 43/0829 |
| 11,368,824 B2* | 6/2022 | Park | H04L 67/306 |
| 11,552,954 B2* | 1/2023 | Zou | H04L 63/0263 |
| 11,606,378 B1* | 3/2023 | Delpont | H04L 43/16 |
| 11,611,532 B1* | 3/2023 | Haefner | H04L 63/1425 |
| 11,611,580 B1* | 3/2023 | Sharifi Mehr | H04L 63/1408 |
| 11,637,853 B2* | 4/2023 | Attar | H04L 63/1425 726/25 |
| 11,711,432 B1* | 7/2023 | Vlachogiannis | G06F 9/44505 709/223 |
| 11,924,342 B2* | 3/2024 | Kong | H04L 9/3297 |
| 2006/0276995 A1* | 12/2006 | Breitgand | H04L 41/5009 702/179 |
| 2007/0025389 A1* | 2/2007 | Garg | H04L 43/0811 370/449 |
| 2008/0049644 A1* | 2/2008 | Halbert | H04L 41/12 370/254 |
| 2012/0078894 A1* | 3/2012 | Jiang | G06F 16/683 707/723 |
| 2014/0141765 A1* | 5/2014 | Burkard | H04W 8/005 455/419 |
| 2015/0163121 A1* | 6/2015 | Mahaffey | H04L 41/142 707/687 |
| 2015/0333998 A1* | 11/2015 | Gopalakrishnan | H04L 41/0636 370/244 |
| 2016/0065592 A1* | 3/2016 | Svigals | H04L 9/3231 726/3 |
| 2016/0094401 A1* | 3/2016 | Anwar | G06F 11/3006 709/223 |
| 2016/0103838 A1* | 4/2016 | Sainani | G06F 16/24 707/725 |
| 2016/0255107 A1* | 9/2016 | Qian | H04L 63/1425 726/23 |
| 2016/0364681 A1* | 12/2016 | Andrus | G06Q 10/087 |
| 2017/0006006 A1* | 1/2017 | Rawcliffe | H04L 63/08 |
| 2017/0026187 A1* | 1/2017 | Ramatchandirane | G06F 21/6218 |
| 2017/0126577 A1* | 5/2017 | Sender | H04L 67/306 |
| 2017/0302656 A1* | 10/2017 | Ramatchandirane | H04L 63/0869 |
| 2017/0339178 A1* | 11/2017 | Mahaffey | G06F 11/3006 |
| 2018/0027006 A1* | 1/2018 | Zimmermann | H04L 63/0227 726/11 |
| 2018/0191729 A1* | 7/2018 | Whittle | H04L 67/303 |
| 2018/0270608 A1* | 9/2018 | Thoresen | H04W 12/06 |
| 2018/0270612 A1* | 9/2018 | Thoresen | G01S 1/02 |
| 2018/0324050 A1* | 11/2018 | Smith | H04L 41/22 |
| 2018/0367518 A1* | 12/2018 | Singh | H04L 63/06 |
| 2019/0003929 A1* | 1/2019 | Shapiro | G05B 23/024 |
| 2019/0020468 A1* | 1/2019 | Rosenoer | H04L 9/3228 |
| 2019/0095518 A1* | 3/2019 | Park | G06F 16/2358 |
| 2019/0102276 A1* | 4/2019 | Dang | G06F 18/24155 |
| 2019/0141919 A1* | 5/2019 | Kundra | G06V 20/188 348/159 |
| 2019/0179610 A1* | 6/2019 | Aiken | H04L 12/2829 |
| 2019/0349247 A1* | 11/2019 | Gonigberg | H04L 41/0681 |
| 2020/0104401 A1* | 4/2020 | Burnett | G06F 16/287 |
| 2020/0153697 A1* | 5/2020 | Turner | H04L 63/0823 |
| 2020/0162503 A1* | 5/2020 | Shurtleff | G06F 9/451 |
| 2020/0177590 A1* | 6/2020 | Levy | H04W 12/10 |
| 2020/0195508 A1* | 6/2020 | Benjamin | H04L 63/20 |
| 2020/0285997 A1* | 9/2020 | Bhattacharyya | G06N 7/00 |
| 2020/0311280 A1* | 10/2020 | Byrne | G06F 3/0647 |
| 2020/0349952 A1* | 11/2020 | Lee | G10L 15/1822 |
| 2020/0379454 A1* | 12/2020 | Trinh | G05B 23/024 |
| 2020/0396147 A1* | 12/2020 | Han | H04L 43/16 |
| 2020/0403871 A1* | 12/2020 | AbiEzzi | H04L 41/12 |
| 2021/0004270 A1* | 1/2021 | Singh | G06F 9/5077 |
| 2021/0004704 A1* | 1/2021 | Dang | G06F 3/0482 |
| 2021/0136433 A1* | 5/2021 | Hong | H04N 21/24 |
| 2021/0182858 A1* | 6/2021 | Wardman | G06Q 20/3821 |
| 2021/0266326 A1* | 8/2021 | Chen | H04L 67/52 |
| 2021/0366268 A1* | 11/2021 | Jain | H04L 41/0823 |
| 2021/0392150 A1* | 12/2021 | Srinivas | G06N 5/047 |
| 2021/0392171 A1* | 12/2021 | Srinivas | G06N 5/047 |
| 2021/0392192 A1* | 12/2021 | Machikoppa | H04L 67/568 |
| 2022/0014509 A1* | 1/2022 | Walters | H04L 63/20 |
| 2022/0100595 A1* | 3/2022 | Shapiro | G06F 11/0736 |
| 2022/0123950 A1* | 4/2022 | Erickson | G06F 9/5072 |
| 2022/0188290 A1* | 6/2022 | Chan | G06F 21/552 |
| 2022/0232025 A1* | 7/2022 | Kapoor | H04L 63/1425 |
| 2022/0329613 A1* | 10/2022 | Abbaszadeh | H04L 63/1416 |
| 2022/0337589 A1* | 10/2022 | Lee | H04L 12/66 |
| 2022/0365834 A1* | 11/2022 | Chen | G06F 11/0793 |
| 2022/0368709 A1* | 11/2022 | Kaye | H04L 63/1425 |
| 2022/0377096 A1* | 11/2022 | Johnston | H04L 63/145 |
| 2023/0029152 A1* | 1/2023 | Zaloum | G06F 21/316 |
| 2023/0160987 A1* | 5/2023 | Wang | A61B 5/7203 382/128 |

OTHER PUBLICATIONS

NPL Search (Year: 2023).*
NPL History Search (Year: 2024).*
NPL Search History (Year: 2024).*

* cited by examiner

| Scenario No. | Device Info. in User Registry | Device Info. from Remote System | Difference Value | Aggregated Difference Values | Indication |
|---|---|---|---|---|---|
| 1 | A, B, C | A, B, C | 0 | Baseline maintained | Device-to-account associations accurate |
| 2 | A, B, C | A, B, C, D | 10 | Steady rise over time | Increasing inaccuracy; potentially no issue |
| 3 | A, B, C | A, B, D | 20 | New basline | Anomalies attributable to false positive |
| 4 | A, B, C | D, E, F | 100 | Sudden rise | Systematic issue with device-to-account associations |

Generate first data representing difference value between second data and third data, wherein: second data represents first device identifier information stored for first devices associated with user account data; and third data represents second device identifier information that system associated with first devices has reported as being associated with user account data
1002

Determine fourth data corresponding to historical difference values associated with system over period of time
1004

Determine, based at least in part on first data and fourth data, trend in difference values associated with system, trend indicating increase in anomalies detected as between second data and third data
1006

Based at least in part on trend, determine to perform action associated with anomalies
1008

DEVICE-TO-ACCOUNT ANOMALY DETECTION

BACKGROUND

Devices may be associated with user accounts. Accurately associating devices with accounts has security implications. Described herein are improvements in technology and solutions to technical problems that can be used to, among other things, enhance account security.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 illustrates an example table showing scenarios where anomalies may be present as between device associations stored between systems.

FIG. 10 illustrates a flow diagram of another example process for device-to-account anomaly detection.

DETAILED DESCRIPTION

Figure 1:
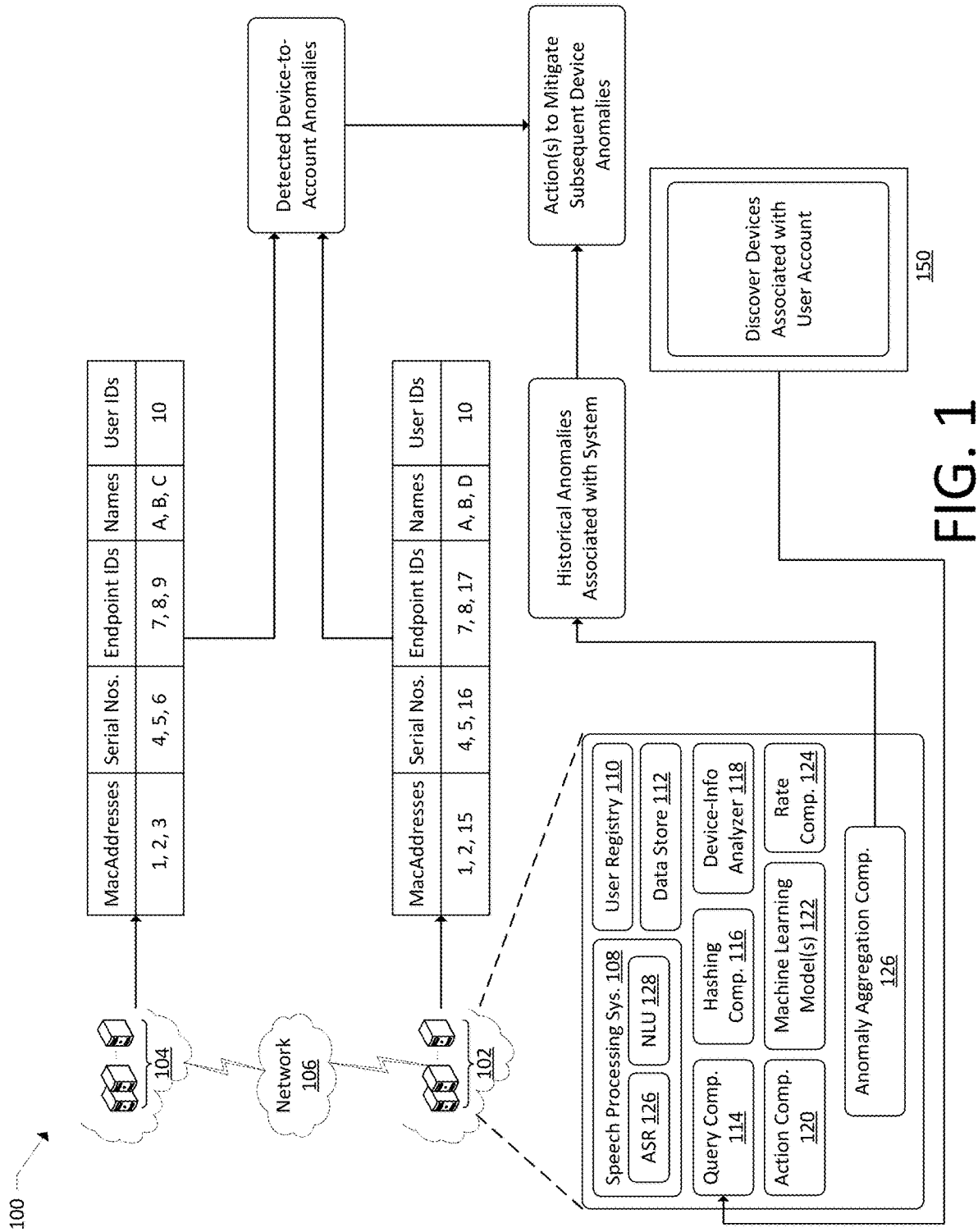
FIG. 1 illustrates a schematic diagram of an example environment for device-to-account anomaly detection.

Systems and methods for device-to-account anomaly detection are disclosed. Take, for example, an environment (such as a home, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, etc.), graphical interface devices (e.g., televisions, set top boxes, virtual/augmented reality headsets, etc.), touch interface devices (tablets, phones, steering wheels, laptops, kiosks, billboard, other devices with buttons, etc.) and/or connected devices (e.g., plugs, lights, cameras, doorbells, televisions, fireplaces, thermostats, wearable devices, and/or any other "smart" devices that perform a function and can be controlled from a personal device and/or a voice interface device). These electronic devices may be situated in a home, in a place a business, healthcare facility (e.g., hospital, doctor's office, pharmacy, etc.), in a vehicle (e.g., airplane, truck, car, bus, etc.) in a public forum (e.g., shopping center, store, etc.), for example.

Generally, certain devices are associated with given user account data. For example, for an environment such as a household, one or more devices may be disposed in the household. For example, voice interface devices may be disposed in a kitchen area, bedrooms, office, etc. of the environment. Additionally, one or more connected devices, such as smart home devices, may be disposed in the environment and may be configured to communicate with the voice interface devices. The connected devices, just by way of example and not as a limitation, may be lights, switches, plugs, thermostats, cameras, doorbells, appliances, and/or any other device associated with the environment. Some of all of these devices may be associated with multiple systems. For example, one or more of the voice interface devices may be associated with a speech processing system. Additionally, certain connected devices may be associated with a given remote system while other connected devices may be associated with another remote system. By way of example, when an environment includes smart plugs, those smart plugs may be associated with a remote system configured to send data to and receive data from the smart plugs. A user may be able to control operation of the smart plugs utilizing a user interface associated with the remote system. Additionally, the environment may include smart doorbells that are associated with another remote system. Again, the user may be able to control operation of the smart doorbells utilizing a different user interface associated with the other remote system. With the proliferation of smart devices, a given environment may include connected devices associated with multiple remote systems.

To promote security and/or for ensuring a desired user experience, the remote systems may store device identifier information indicating which devices are associated with given user accounts. For example, a given remote system may store device identifier information indicating that first devices are associated with a first user account, while the same remote system may also store device identifier information indicating that second devices are associated with a second user account. Again, given the proliferation of smart devices as well as systems associated with those devices, hundreds of thousands if not more device-to-account associations are stored with respect to the remote systems associated with those smart devices. In addition to device identifier information stored by the remote systems, the speech processing system associated with the voice interface devices may also store device identifier information indicating device-to-account associations. This information is useful for the speech processing system to, for example, determine devices that may be acted on in response to user voice commands.

However, sometimes the device identifier information stored with respect to the remote systems does not correspond to the device identifier information stored with respect to the speech processing system. For example, a user registry of the speech processing system may indicate that Devices A, B, and C are associated with given user account data, while a remote system associated with these devices indicates that Devices A, B, C, and D are associated with the user account data. This indicates that the remote system associates an extra device, Device D, with the user account data. By way of further example, the remote system may indicate that Devices A, B, and D are associated with the remote system. This indicates that the remote system associates a device, Device D, with the user account data that the user registry does not associate with the user account data. By way of additional example, the remote system may indicate that Devices D, E, and F are associated with the user account data. This indicates that completely different devices are associated with the user account data as between the user registry and the remote system. In each of these examples, anomalies in device-to-account associations may cause security breaches and/or may hinder functionality of the devices by users.

To promote device security, device-to-account anomaly detection may be performed to identify erroneous device-to-account associations and to take corrective action. For example, as indicated above, device identifier information may be stored in a user registry of a system associated with voice interface devices. This system associated with the voice interface devices will be described herein as "the system." Additionally, device identifier information may be stored with respect to one or more remote systems associated with one or more connected devices. These connected-device systems will be described herein as "remote systems." A query component of the system may be configured to query the one or more remote systems for device identifier information. For example, the query component may query the remote systems on a periodic, scheduled, and/or directed basis. By way of example, the query component may query the remote systems once every 24 hours, and/or at a certain time of day and/or day of the week. The query component may also query the remote systems based at least in part on user input. For example, when a user adds a new device to a user account, this occurrence may trigger the query component to request device identifier information from the remote system associated with the new device. It should be understood that one or more other trigger events for querying the remote system are contemplated and included in this disclosure.

In examples, a user interface associated with an application on a personal device may be utilized to trigger the anomaly detection operations described herein. For example, when a user acquires a device, the user may install or otherwise access an application associated with the device and the remote system that may be utilized to operate the device. Various user inputs associated with the application may be utilized to trigger the query component to request the device information from the remote system. Such user inputs may include, by way of example and not as a limitation, changing device states, adding a device to the user account, removing a device from the user account, renaming a device, installing the application, changing user preferences, etc. Additionally, on-demand discovery requests, such as user input requesting that devices within a given range of the personal device be detected and associated with the user account may serve as a trigger event for querying the remote system for device information.

The system may receive the device identifier information from the remote system that was queried. The device identifier information may include any information that identifies or is otherwise associated with devices that the remote system has associated with the user account at issue. For example, the device identifier information may include media access control (MAC) addresses, serial numbers, endpoint identifiers, naming indicators, and/or user identifiers as stored by the remote system. The MAC addresses may indicate the network interface controller identifier designated for use by the device(s). The serial numbers may include the identifier of the device(s) as provided by the manufacturer of the device(s). The endpoint identifiers may indicate a unique identifier of the device(s) as provided by the remote system. The naming indicators may indicate the name of the device(s) as supplied by the remote system and/or by a user of the device, such as "bedroom light," etc. The user identifiers may indicate the user(s) associated with the device(s) and/or the user accounts associated with the device(s). The types of device identifier information presented above are provided by way of example and not as a limitation. It should be understood that additional or different device identifier types are also included in this disclosure. It should also be understood that while multiple examples provided herein discuss receiving the device information from a remote system associated with given devices, the device information may be received from the devices themselves. Additionally, when the devices and remote systems described herein are described as separate from the system associated with voice interface devices, the devices may be devices associated with the system and the remote system may be a component of the system itself.

Once the device identifier information is acquired from the remote system, a hashing component may be configured to generate hash values representing the device identifier information. For example, locality-sensitive hashing may be utilized to generate a hash value for the device identifier information. In these examples, input data for the hashing component may include the device identifier information received from the remote system. The hashing component may then utilize the device identifier information to generate a hash value that represents the device identifier information. The hashing component may also utilize device identifier information from the user registry to generate a hash value that represents that device identifier information. Here, utilizing locality-sensitive hashing, when the input to the hashing component is consistent, the resulting hash value will be consistent. In other words, if the device identifier information from the remote system matches the device identifier information stored in the user registry, the hash values generated by the hashing component will be the same. However, when an anomaly is present as between the device identifier information stored by the remote system and by the user registry, the hash values will differ. However, unlike other hash functions where hash collisions are minimized such that even small variations in input result in complete or nearly-complete differences in hash values, locality-sensitive hashing allows for hash collisions to be maximized. As such, when variations in input result, the quantity of differences can be determined from the resulting hash values. For example, when the device identifier information from the user registry indicates that Devices A, B, and C are associated with given user account data, but the device identifier information from the remote system indicates Devices A, B, C, and D are associated with the user account data, the resulting hash values will mostly correspond to each other but a slight variation representing the additional Device D will be present. By way of additional example, user registry information associating Devices A, B, and C with the user account data, and remote system information associating Devices A, B, and D with the user account data, will result in hash values with some similarities and some differences. In this example, the difference in hash values will be greater than the differences from the prior example because of both the addition of Device D and the missing Device C. By way of further example, user registry information associating Devices A, B, and C with the user account data, and remote system information associating Devices D, E, and F with the user account data, will result in completely different hash values.

It should be understood that while hashing is described herein as one method of comparing and quantifying differences between device identifier information stored between the user registry and the remote system, other methodologies are also included in this disclosure. For example, string matching, vectorizing, and/or data formatting techniques may be utilized. Generally, the techniques may include functionality that compares the device identifier information from the user registry and from the remote system to identify what data differs. The results of this analysis may then be utilized by the device-information analyzer to quantify the detected anomaly.

For example, the device-information analyzer may receive resulting data from the hashing component and may be configured to analyze the hash values to generate a difference value that indicates the difference(s) between the hash values. By way of example, when the device identifier information stored by the user registry and by the remote system corresponds with each other, the hash values may be the same and the device-information analyzer may generate data indicating that no difference is present. In examples, this data may be represented as a score, which may be associated with a scale. To illustrate, the scale may be from 0 to 100, with 0 indicating no difference between the device identifier information stored by the user registry and the remote system, and 100 indicating complete difference between the information stored by the user registry and the remote system. When a slight variation is determined, such as when the user registry indicates Devices A, B, and C are associated with the user account data but the remote system indicates Devices, A, B, C, and D are associated with the user account data, the device-information analyzer may analyze the hash values and produce a resulting score of 10, by way of example. In the example where the user registry indicates Devices A, B, and C are associated with the user account data, but the remote system indicates Devices A, B, and D are associated with the user account data, the device-information analyzer may analyze the hash values and produce a resulting score of 20, by way of example. And when the user registry indicates Devices A, B, and C are associated with the user account data, but the remote system indicates Devices D, E, and F are associated with the user account data, the device-information analyzer may analyze the hash values and produce a resulting score of 100, by way of example.

The difference values produced by the device-information analyzer may be stored in a data store associated with the system. The difference values may be associated with an identifier of the remote system from which the device identifier information was received as well as other information associated with the analysis, such as the time when the analysis occurred, the user account data associated with the analysis, and/or any other information associated with the difference values.

In certain examples, actions may be taken based at least in part on the detected anomalies from one analysis of received device information from the remote system and the stored device information in the user registry. However, in other examples, actions may be taken based at least in part on an aggregation of anomalies associated with the remote system over a period of time. For example, an aggregation component may be configured to retrieve difference values from the data store for a given remote system and to aggregate the difference values, such as over a given period of time, to determine whether a corrective action should be taken. For example, if aggregation of the difference values over a period of time indicates less than a threshold number of detected anomalies and/or less than a threshold severity of detected anomalies, then the system may determine to refrain from taking a corrective action. However, when a rise in anomalies is detected, particularly when the rise in anomalies results in difference values satisfying a given threshold difference value, the aggregation component may detect these results and an action component, as described more fully below, may be configured to take a corrective action.

In still other examples, the aggregation component may be configured to detect not just a rise in difference values, but also baselines for anomalies associated with the remote system in question. For example, a given remote system may typically be associated with difference values between 0 and 5 on a scale of 0 to 100. The aggregation component may be configured to utilizing this information to establish a baseline for the remote system that is between, for example, 0 and 5. Additionally, certain remote systems may experience a rise in detected anomalies and/or anomaly severities but then the difference values may remain relatively constant. For example, the remote system may have a baseline between 0 and 5, then experience a rise from 5 to 15, and then experience difference values between 15 and 20. The aggregation component may be configured to detect these changes in difference values over time and establish a new baseline of between 15 and 20. The aggregation component may establish the new baseline when, for example, the remote system sends data indicating that the increase in difference values is attributable to a false-positive, which may be caused by a delay in reporting new devices, removed devices, and/or a change in the way that device information is stored, for example. In these examples, while the remote system's device information may differ from the device information stored in the user registry, those differences do not correspond to improperly associating devices with user accounts. As such, the new baseline may be established and utilized for determining whether to take corrective actions based on subsequent detected anomalies.

The aggregation component may also be utilized to confirm that detected anomalies decrease after a corrective action is taken by the system and/or the remote system. For example, when the difference values satisfy a threshold difference value, such as for a given period of time, a corrective action may be taken as outlined elsewhere herein. Thereafter, the aggregation component may monitor difference values associated with the remote system and determine whether the difference values start to decrease, such as within a given amount of time. If the difference values decrease, such as below the threshold difference value, then no additional corrective action may be taken and/or a notification may be sent to the remote system indicating that the issue has been mitigated. However, in instances where the difference values do not start to decrease and/or do not decrease below the threshold difference value, the system may take additional corrective actions to mitigate the device-to-account anomalies.

An action component of the system may be configured to utilize the difference values and/or historical difference values as stored in the data store to determine whether an action should be taken, such as an action to mitigate the anomalies detected as between device identifier information stored by the user registry and by the remote system. For example, the action component may determine that the historical difference values indicate the remote system stores device identifier information accurately, but that, for a given user account, anomalies have been detected. In these examples, the action component may select an action such as notifying the remote system that the anomaly has been detected with respect to the user account in question. In other examples, the action component may determine that the detected anomalies correspond to a given event, such as when a user adds a new device to the user account. In these examples, the anomaly may indicate a delay in association of the new device with the user account data, either by the remote system or by the user registry. In these examples, the action may include refraining from sending any notification and/or taking other types of mitigating action. Instead, the action may include waiting a period of time before querying the remote system for updated device identifier information. In still other examples, the action component may determine that the historical difference values satisfy one or more thresholds for taking certain actions. For example, the thresholds may include a certain number of detected anomalies, a certain number of detected anomalies having a difference value above a given threshold value, a certain rate of detected anomalies, etc. In these examples, the detected anomalies may indicate a more systematic problem with how the remote system stores device identifier information and/or an error in communicating device identifier information as between the system and the remote system. In these examples, the action component may select an action to mitigate the anomalies, such as instructing the remote system to fix the problem, temporarily or permanently stopping use of the remote system by users, notifying users of the problem, etc.

The system may also include one or more machine learning models that may be configured to determine a likely cause of the detected anomaly and/or to identify an action to be taken based at least in part on the detected anomaly. For example, the device identifier information, the hash values, and/or the difference values may be utilized as input data to the machine learning models, which may be trained as described herein. The machine learning models may utilize this input data to generate results data indicating a likely cause of the detected anomalies as well as a confidence score associated with the results data. Based at least in part on the determined cause and/or the confidence score, the machine learning models may identify an action associated with the cause that is determined to mitigate negative consequences of the anomaly. This information may be provided to the action component for selecting an action as described herein.

Additionally, a rate component of the system may be configured to determine a rate at which to query the remote system(s) for device identifier information. As described above, the remote system(s) may be queried on a periodic, scheduled, and/or user-requested basis. When queried on a periodic and/or scheduled basis, the querying may be dynamic and/or may be based at least in part on historical accuracy of stored device identifier information associated with a given remote system. For example, when the historical difference values for a given remote system satisfy a threshold that indicates the remote system generally stores device identifier information accurately, the rate component may determine that the remote system should be queried less frequently than other remote systems. For example, the remote system may be queried every 48 hours instead of every 24 hours. In other examples where the historical difference values indicate the remote system generally does not store device identifier information accurately, and/or when a given action has been performed to mitigate anomalies as described herein, the rate component may determine that the remote system should be queried more frequently than other remote systems. For example, the remote system should be queried every 12 hours instead of every 24 hours.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for device-to-account anomaly detection. The environment 100 may include, for example, a system 102 associated with voice interface devices and one or more remote systems 104 associated with connected devices. The environment 100 may also include electronic devices, not depicted, which may be associated with the system 102 and/or the remote systems 104. In certain examples, the devices may be a voice-enabled device (e.g., Echo devices, mobile phones, tablets, personal computers, etc.), which may include video interface devices (e.g., televisions, set top boxes, virtual/augmented reality headsets, etc.) and/or a touch interface device (tablets, phones, laptops, kiosks, billboard, etc.). The devices may also include connected devices such as locks, plugs, lights, thermostats, appliances, doorbells, wearables, and/or any other device that may be in communication with voice interface devices. In examples, the devices may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, hotel, etc.), for example. The devices may be configured to send data to and/or receive data from the system 102 and/or the remote systems 104, such as via a network 106. It should be understood that where operations are described herein as being performed by the system 102, some or all of those operations may be performed by the devices. It should also be understood that anytime the system 102 is referenced, that system may include any system and/or device, whether local to an environment of the devices or remote from that environment. Additionally, it should be understood that a given space and/or environment may include numerous electronic devices. It should also be understood that when a "space" or "environment" is used herein, those terms mean an area and not necessarily a given room, building, or other structure, unless otherwise specifically described as such.

The devices may include one or more components, such as, for example, one or more processors, one or more network interfaces, memory, one or more microphones, one or more speakers, and/or one or more displays. The microphones may be configured to capture audio, such as user utterances, and generate corresponding audio data. The speakers may be configured to output audio, such as audio corresponding to audio data received from another device and/or the system 102. The displays may be configured to display images corresponding to image data, such as image data received from the system 102 and/or one or more other devices. The devices may also include device functionality that a given device is configured to perform, such as sending information, outputting audio, outputting video, outputting light, etc.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 106 and to communicate with other devices in the environment. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 102 may include components such as, for example, a speech processing system 108, a user registry 110, a data store 112, a query component 114, a hashing component 116, a device-information analyzer 118, an action component 120, one or more machine learning models 122, and/or a rate component 124. It should be understood that while the components of the system 102 are depicted and/or described as separate from each other in FIG. 1, some or all of the components may be a part of the same system. The speech processing system 108 may include an automatic speech recognition component (ASR) 126 and/or a natural language understanding component (NLU) 128. Each of the components described herein with respect to the system 102 may be associated with their own systems, which collectively may be referred to herein as the system 102, and/or some or all of the components may be associated with a single system. Additionally, the system 102 may include one or more applications, which may be described as skills. "Skills," as described herein may be applications and/or may be a subset of an application. For example, a skill may receive data representing an intent. For example, an intent may be determined by the NLU component 128 and/or as determined from user input via a computing device. Skills may be configured to utilize the intent to output data for input to a text-to-speech component, a link or other resource locator for audio data, and/or a command to a device. "Skills" may include applications running on devices and/or may include portions that interface with voice user interfaces of devices.

In instances where a voice-enabled device is utilized, skills may extend the functionality of devices that can be controlled by users utilizing a voice-user interface. In some examples, skills may be a type of application that may be useable in association with secondary devices and may have been developed specifically to work in connection with given secondary devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

In examples, some or each of the components of the system 102 may include their own processor(s), network interface(s), and/or memory. As such, by way of example, the speech processing system 108 may include and/or be associated with processor(s), network interface(s), and/or memory. The other components of the system 102, such as the hashing component 116, may include and/or be associated with different processor(s), network interface(s), and/or memory, or one or more of these components may utilize some or all of the same processor(s), network interface(s), and/or memory utilized by the speech processing system 108. These components are described in detail below: Additionally, the operations and/or functionalities associated with and/or described with respect to the components of the system 102 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 102, the user registry 110 may be configured to determine and/or generate associations between users, user accounts, environment identifiers, and/or devices. For example, one or more associations between user accounts may be identified, determined, and/or generated by the user registry 108. The user registry 108 may additionally store information indicating one or more applications and/or resources accessible to and/or enabled for a given user account. Additionally, the user registry 108 may include information indicating device identifiers, such as naming identifiers, associated with a given user account, as well as device types associated with the device identifiers. The user registry 108 may also include information indicating user account identifiers, naming indicators of devices associated with user accounts, and/or associations between devices. The user registry 108 may also include information associated with usage of the devices. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 102 may be stored or otherwise associated with an account identifier. Data associated with the user accounts may include, for example, account access information, historical usage data, device-association data, and/or preference data.

The speech-processing system 108 may be configured to receive audio data from the devices and/or other devices and perform speech-processing operations. For example, the ASR component 126 may be configured to generate text data corresponding to the audio data, and the NLU component 128 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "add Device D," the NLU component 128 may identify an "add" intent and the payload may be "Device D." In this example where the intent data indicates an intent to discover a newly acquired device, the speech processing system 108 may call one or more speechlets to effectuate the intent. Speechlets, as described herein may otherwise be described as applications and may include functionality for utilizing intent data to generate directives and/or instructions. For example, a speechlet associated with discovering devices. The speechlet may be designated as being configured to handle the intent of discovering devices and providing instructions for pairing or otherwise setting up devices, for example. The speechlet may receive the intent data and/or other data associated with the user utterance from the NLU component 126, such as by an orchestrator of the system 102, and may perform operations to identify the new device and associate that device with the user account data. The system 102 may generate audio data confirming that the device has been discovered, such as by a text-to-speech component. The data may be sent from the system 102 to a voice interface device associated with the environment.

The components of the system 102 are described below by way of example. For example, to promote security and/or for ensuring a desired user experience, the remote systems 104 may store device identifier information indicating which devices are associated with given user accounts. For example, a given remote system 104 may store device identifier information indicating that first devices are associated with a first user account, while the same remote system 104 may also store device identifier information indicating that second devices are associated with a second user account. Again, given the proliferation of smart devices as well as systems associated with those devices, hundreds of thousands if not more device-to-account associations are stored with respect to the remote systems 104 associated with those smart devices. In addition to device identifier information stored by the remote systems 104, the system 102 may also store device identifier information indicating device-to-account associations. This information is useful for the system 102 to, for example, determine devices that may be acted on in response to user voice commands.

However, sometimes the device identifier information stored with respect to the remote systems 104 does not correspond to the device identifier information stored with respect to the system 102. For example, the user registry 110 may indicate that Devices A, B, and C are associated with given user account data, while a remote system 104 associated with these devices indicates that Devices A, B, C, and D are associated with the user account data. This indicates that the remote system 104 associates an extra device, Device D, with the user account data. By way of further example, the remote system 104 may indicate that Devices A, B, and D are associated with the remote system 104. This indicates that the remote system 104 associates a device, Device D, with the user account data that the user registry 110 does not associate with the user account data. By way of additional example, the remote system 104 may indicate that Devices D, E, and F are associated with the user account data. This indicates that completely different devices are associated with the user account data as between the user registry 110 and the remote system 104. In each of these examples, anomalies in device-to-account associations may cause security breaches and/or may hinder functionality of the devices by users.

To promote device security, device-to-account anomaly detection may be performed to identify erroneous device-to-account associations and to take corrective action. For example, as indicated above, device identifier information may be stored in the user registry 110 of the system 102. Additionally, device identifier information may be stored with respect to one or more remote systems 104 associated with one or more connected devices. The query component 114 may be configured to query the one or more remote systems 104 for device identifier information. For example, the query component 114 may query the remote systems 104 on a periodic, scheduled, or directed basis. By way of example, the query component 114 may query the remote systems 104 once every 24 hours, and/or at a certain time of day and/or day of the week. The query component 114 may also query the remote systems 104 based at least in part on user input. For example, when a user adds a new device to a user account, this occurrence may trigger the query component 114 to request device identifier information from the remote system 104 associated with the new device. It should be understood that one or more other trigger events for querying the remote system 104 are contemplated and included in this disclosure.

In examples, a user interface associated with an application on a personal device 150 may be utilized to trigger the anomaly detection operations described herein. For example, when a user acquires a device, the user may install or otherwise access an application associated with the device and the remote system 104 that may be utilized to operate the device. Various user inputs associated with the application may be utilized to trigger the query component 114 to request the device information from the remote system 104. Such user inputs may include, by way of example and not as a limitation, changing device states, adding a device to the user account, removing a device from the user account, renaming a device, installing the application, changing user preferences, etc. Additionally, on-demand discovery requests, such as user input requesting that devices within a given range of the personal device 150 be detected and associated with the user account may serve as a trigger event for querying the remote system 104 for device information.

The system 102 may receive the device identifier information from the remote system 104 that was queried. The device identifier information may include any information that identifies or is otherwise associated with devices that the remote system 104 has associated with the user account at issue. For example, the device identifier information may include MAC addresses, serial numbers, endpoint identifiers, naming indicators, and/or user identifiers as stored by the remote system. The MAC addresses may indicate the network interface controller designated for use by the device(s). The serial numbers may include the identifier of the device(s) as provided by the manufacturer of the device(s). The endpoint identifiers may indicate a unique identifier of the device(s) as provided by the remote system 104. The naming indicators may indicate the name of the device(s) as supplied by the remote system 104 and/or by a user of the device, such as "bedroom light," etc. The user identifiers may indicate the user(s) associated with the device(s) and/or the user accounts associated with the device(s). The types of device identifier information presented above are provided by way of example and not as a limitation. It should be understood that additional or different device identifier types are also included in this disclosure.

Once the device identifier information is acquired from the remote system 104, the hashing component 116 may be configured to generate hash values representing the device identifier information. For example, locality-sensitive hashing may be utilized to generate a hash value for the device identifier information. In these examples, input data for the hashing component 116 may include the device identifier information received from the remote system 104. The hashing component 116 may then utilize the device identifier information to generate a hash value that represents the device identifier information. The hashing component 116 may also utilize device identifier information from the user registry 110 to generate a hash value that represents that device identifier information. Here, utilizing locality-sensitive hashing, when the input to the hashing component 116 is consistent, the resulting hash value will be consistent. In other words, if the device identifier information from the remote system 104 matches the device identifier information stored in the user registry 110, the hash values generated by the hashing component 116 will be the same. However, when an anomaly is present as between the device identifier information stored by the remote system 104 and by the user registry 110, the hash values will differ. However, unlike other hash functions where hash collisions are minimized such that even small variations in input result in complete or nearly-complete differences in hash values, locality-sensitive hashing allows for hash collisions to be maximized. As such, when variations in input result, the quantity of differences can be determined from the resulting hash values. For example, when the device identifier information from the user registry 110 indicates that Devices A, B, and C are associated with given user account data, but the device identifier information from the remote system 104 indicates Devices A, B, C, and D are associated with the user account data, the resulting hash values will mostly correspond to each other but a slight variation representing the additional Device D will be present. By way of additional example, user registry information associating Devices A, B, and C with the user account data, and remote system information associating Devices A, B, and D with the user account data, will result in hash values with some similarities and some differences. In this example, the difference in hash values will be greater than the differences from the prior example because of both the addition of Device D and the missing Device C. By way of further example, user registry information associating Devices A, B, and C with the user account data, and remote system information associating Devices D, E, and F with the user account data, will result in completely different hash values.

It should be understood that while hashing is described herein as one method of comparing and quantifying differences between device identifier information stored between the user registry 110 and the remote system 104, other methodologies are also included in this disclosure. For example, string matching, vectorizing, and/or data formatting techniques may be utilized. Generally, the techniques may include functionality that compares the device identifier information from the user registry 110 and from the remote system 104 to identify what data differs. The results of this analysis may then be utilized by the device-information analyzer 118 to quantify the detected anomaly.

For example, the device-information analyzer 118 may receive resulting data from the hashing component 116 and may be configured to analyze the hash values to generate a difference value that indicates the difference(s) between the hash values. By way of example, when the device identifier information stored by the user registry 110 and by the remote system 104 corresponds with each other, the hash values may be the same and the device-information analyzer 118 may generate data indicating that no difference is present. In examples, this data may be represented as a score, which may be associated with a scale. To illustrate, the scale may be from 0 to 100, with 0 indicating no difference between the device identifier information stored by the user registry 110 and the remote system 104, and 100 indicating complete difference between the information stored by the user registry 110 and the remote system 104. When a slight variation is determined, such as when the user registry 110 indicates Devices A, B, and C are associated with the user account data but the remote system 104 indicates Devices, A, B, C, and D are associated with the user account data, the device-information analyzer 118 may analyze the hash values and produce a resulting score of 10, by way of example. In the example where the user registry 110 indicates Devices A, B, and C are associated with the user account data, but the remote system 104 indicates Devices A, B, and D are associated with the user account data, the device-information analyzer 118 may analyze the hash values and produce a resulting score of 20, by way of example. And when the user registry 110 indicates Devices A, B, and C are associated with the user account data, but the remote system 104 indicates Devices D, E, and F are associated with the user account data, the device-information analyzer 118 may analyze the hash values and produce a resulting score of 100, by way of example. It should be understood that the method of scoring and/or the scale described herein are provided by way of example and not as a limitation. The scoring may take any form and the scale may be of any type or value.

The difference values produced by the device-information analyzer 118 may be stored in a data store associated with the system 102. The difference values may be associated with an identifier of the remote system 104 from which the device identifier information was received as well as other information associated with the analysis, such as the time when the analysis occurred, the user account data associated with the analysis, and/or any other information associated with the difference values.

In certain examples, actions may be taken based at least in part on the detected anomalies from one analysis of received device information from the remote system 104 and the stored device information in the user registry 110. However, in other examples, actions may be taken based at least in part on an aggregation of anomalies associated with the remote system 104 over a period of time. For example, an anomaly aggregation component 126 may be configured to retrieve difference values from the data store 112 for a given remote system 104 and to aggregate the difference values, such as over a given period of time, to determine whether a corrective action should be taken. For example, if aggregation of the difference values over a period of time indicates less than a threshold number of detected anomalies and/or less than a threshold severity of detected anomalies, then the system 102 may determine to refrain from taking a corrective action. However, when a rise in anomalies is detected, particularly when the rise in anomalies results in difference values satisfying a given threshold difference value, the anomaly aggregation component 126 may detect these results and the action component 120, as described more fully below; may be configured to take a corrective action.

In still other examples, the aggregation component 126 may be configured to detect not just a rise in difference values, but also baselines for anomalies associated with the remote system 104 in question. For example, a given remote system 104 may typically be associated with difference values between 0 and 5 on a scale of 0 to 100. The aggregation component 126 may be configured to utilizing this information to establish a baseline for the remote system 104 that is between, for example, 0 and 5. Additionally, certain remote systems 104 may experience a rise in detected anomalies and/or anomaly severities but then the difference values may remain relatively constant. For example, the remote system 104 may have a baseline between 0 and 5, then experience a rise from 5 to 15, and then experience difference values between 15 and 20. The aggregation component 126 may be configured to detect these changes in difference values over time and establish a new baseline of between 15 and 20. The aggregation component 126 may establish the new baseline when, for example, the remote system 104 sends data indicating that the increase in difference values is attributable to a false-positive, which may be caused by a delay in reporting new devices, removed devices, and/or a change in the way that device information is stored. In these examples, while the remote system's device information may differ from the device information stored in the user registry 110, those differences do not correspond to improperly associating devices with user accounts. As such, the new baseline may be established and utilized for determining whether to take corrective actions based on subsequent detected anomalies.

The aggregation component 126 may also be utilized to confirm that detected anomalies decrease after a corrective action is taken by the system 102 and/or the remote system 104. For example, when the difference values satisfy a threshold difference value, such as for a given period of time, a corrective action may be taken as outlined elsewhere herein. Thereafter, the aggregation component 126 may monitor difference values associated with the remote system 104 and determine whether the difference values start to decrease, such as within a given amount of time. If the difference values decrease, such as below the threshold difference value, then no additional corrective action may be taken and/or a notification may be sent to the remote system 104 indicating that the issue has been mitigated. However, in instances where the difference values do not start to decrease and/or do not decrease below the threshold difference value, the system 102 may take additional corrective actions to mitigate the device-to-account anomalies.

The action component 120 may be configured to utilize the difference values and/or historical difference values as stored in the data store 112 to determine whether an action should be taken, such as an action to mitigate the anomalies detected as between device identifier information stored by the user registry 110 and by the remote system 104. For example, the action component 120 may determine that the historical difference values indicate the remote system 104 stores device identifier information accurately, but that, for a given user account, anomalies have been detected. In these examples, the action component 120 may select an action such as notifying the remote system 104 that the anomaly has been detected with respect to the user account in question. In other examples, the action component 120 may determine that the detected anomalies correspond to a given event, such as when a user adds a new device to the user account. In these examples, the anomaly may indicate a delay in association of the new device with the user account data, either by the remote system 104 or by the user registry 110. In these examples, the action may include refraining from sending any notification and/or taking other types of mitigating action. Instead, the action may include waiting a period of time before querying the remote system 104 for updated device identifier information. In still other examples, the action component 120 may determine that the historical difference values satisfy one or more thresholds for taking certain actions. For example, the thresholds may include a certain number of detected anomalies, a certain number of detected anomalies having a difference value that satisfies a given threshold value, a certain rate of detected anomalies, etc. In these examples, the detected anomalies may indicate a more systematic problem with how the remote system 104 stores device identifier information and/or an error in communicating device identifier information as between the system 102 and the remote system 104. In these examples, the action component 120 may select an action to mitigate the anomalies, such as instructing the remote system 104 to fix the problem, temporarily or permanently stopping use of the remote system 104 by users, notifying users of the problem, etc.

The system 102 may also include the one or more machine learning models 122 that may be configured to determine a likely cause of the detected anomaly and/or to identify an action to be taken based at least in part on the detected anomaly. For example, the device identifier information, the hash values, and/or the difference values may be utilized as input data to the machine learning models 122, which may be trained as described below. The machine learning models 122 may utilize this input data to generate results data indicating a likely cause of the detected anomalies as well as a confidence score associated with the results data. Based at least in part on the determined cause and/or the confidence score, the machine learning models 122 may identify an action associated with the cause that is determined to mitigate negative consequences of the anomaly. This information may be provided to the action component 120 for selecting an action as described herein.

The machine learning models 122 as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether a given event caused an anomaly and/or whether a given action will mitigate the anomaly. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence. The machine learning models 122 may be trained utilizing some of all of the data described herein to produce trained machine learning models, that may be utilized as described herein.

Additionally, the rate component 124 may be configured to determine a rate at which to query the remote system(s) 104 for device identifier information. As described above, the remote system(s) 104 may be queried on a periodic, scheduled, and/or user-requested basis. When queried on a periodic and/or scheduled basis, the querying may be dynamic and/or may be based at least in part on historical accuracy of stored device identifier information associated with a given remote system 104. For example, when the historical difference values for a given remote system 104 satisfy a threshold that indicates the remote system 104 generally stores device identifier information accurately, the rate component 124 may determine that the remote system 124 should be queried less frequently than other remote systems 104. For example, the remote system 104 may be queried every 48 hours instead of every 24 hours. In other examples where the historical difference values indicate the remote system 104 generally does not store device identifier information accurately, and/or when a given action has been performed to mitigate anomalies as described herein, the rate component 124 may determine that the remote system 104 should be queried more frequently than other remote systems 104. For example, the remote system 104 should be queried every 12 hours instead of every 24 hours.

It should be noted that while text data is described as a type of data utilized to communicate between various components of the system 102 and/or other systems and/or devices, the components of the system 102 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices.

As shown in FIG. 1, several of the components of the system 102 and the associated functionality of those components as described herein may be performed by one or more of the devices described herein. Additionally, or alternatively, some or all of the components and/or functionalities associated with the devices may be performed by the system 102.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as the processor(s) described with respect to the components of the system 102, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) described with respect to the components of the system 102 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) described with respect to the components of the system 102 may possess its own local memory, which also may store program components, program data, and/or one or more operating systems.

The memory described with respect to the components of the system 102 may include volatile and nonvolatile memory, removable and non-removable media implemented in any method or technology for storage of information, such as computer-readable instructions, data structures, program component, or other data. Such memory described with respect to the components of the system 102 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory described with respect to the components of the system 102 may be implemented as computer-readable storage media ("CRSM"), which may be any available physical media accessible by the processor(s) described with respect to the system 102 to execute instructions stored on the memory described with respect to the components of the system 102. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory described with respect to the components of the system 102, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project: other UNIX or UNIX-like variants: a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

The network interface(s) described with respect to the components of the system 102 may enable messages between the components and/or devices shown in environment 100 and/or with one or more other polling systems, as well as other networked devices. Such network interface(s) described with respect to the components of the system 102 may include one or more network interface controllers (NICs) or other types of transceiver devices to send and receive messages over the network 106.

For instance, each of the network interface(s) described with respect to the components of the system 102 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) described with respect to the components of the system 102 may include a wide area network (WAN) component to enable message over a wide area network.

In some instances, the system 102 may be local to an environment associated the devices described herein. For instance, the system 102 may be located within one or more of the devices. In some instances, some or all of the functionality of the system 102 may be performed by one or more of the devices. Also, while various components of the system 102 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device in a home and/or office environment, a self-driving automobile, a bus, an airplane, a camper, a trailer, and/or other similar object having a computer to perform its own sensor processing, etc.

FIG. 2 illustrates an example table 200 showing scenarios where anomalies may be present as between device associations stored between systems. FIG. 2 illustrates four scenarios associated with device-to-account associations. It should be understood that the techniques described herein may be utilized in association with any one of these scenarios and/or other scenarios that are not explicitly described with respect to FIG. 2.

With respect all of the scenarios, a query component may be configured to query device identifier information associated with user account data from a remote system. Additionally, device identifier information associated with the user account data may also be stored in a user registry. This information may be analyzed as described herein to identify device-to-account anomalies and to take actions.

With respect to Scenario 1, the device identifier information from the user registry may indicate that Devices A, B, and C are associated with given user account data. Additionally, the device identifier information from the remote system may indicate that Devices A, B, and C are associated with the user account data. In this example, hash values may be generated for the device information associated with the user registry and the remote system, and those hash values may be analyzed to identify differences between the hash values. Here, where the device identifier information from the remote system corresponds to the device identifier information as stored in the user registry, the difference value may be 0) because no difference has been detected. Additionally, when this anomaly information is aggregated with previous anomaly information associated with the remote system in question, an aggregation component may be utilized to determine a trend in detected anomalies. Here, the trend indicates that a baseline difference value associated with the remote system is maintained and that device-to-account associations are accurate.

With respect to Scenario 2, the device identifier information from the user registry may indicate that Devices A, B, and C are associated with the given user account data. Additionally, the device identifier information from the remote system may indicate that Devices, A, B, C, and D are associated with the user account data. In this example, hash values may be generated for the device information associated with the user registry and the remote system, and those hash values may be analyzed to identify differences between the hash values. Here, the difference value may be 10, such as on a scale from 0 to 100, indicating a comparatively slight difference between the hash values. This difference value may indicate that a new device has been added to the user account data, but that either the user registry or the remote system has not yet associated the device with the user account data. Alternatively, this difference value may indicate Device D is improperly associated with the user account data. Additionally, when this anomaly information is aggregated with previous anomaly information associated with the remote system in question, the aggregation component may be utilized to determine a trend in detected anomalies. Here, the trend indicates that there is a steady rise in difference values over a period of time, and that device-to-account associations are increasing in inaccuracy. In other examples, the steady rise may indicate that further investigation into the cause of the rise is desirable. That investigation may include the use of modeling to determine what the cause of the inaccuracy is and to determine if the cause merits a corrective action. For example, as shown in FIG. 2, the inaccuracy is caused by an additional device, Device D, being reported by the remote system. This may be caused by a delay in the way the user registry and/or the remote system stores device information, not necessarily that the additional device is not accurately associated with the user account data at issue.

With respect to Scenario 3, the device identifier information from the user registry may indicate that Devices A, B, and C are associated with the given user account data. Additionally, the device identifier information from the remote system may indicate that Devices, A, B, and D are associated with the user account data. In this example, hash values may be generated for the device information associated with the user registry and the remote system, and those hash values may be analyzed to identify differences between the hash values. Here, the difference value may be 20, such as on a scale from 0 to 100, indicating a greater difference between the hash values as compared to Scenario 1 and 2. This difference value may indicate that Device C is missing from the stored data of the remote system and that Device D is improperly associated with the user account data. In other words, this may indicate that devices have been switched as between multiple user accounts. Additionally, when this anomaly information is aggregated with previous anomaly information associated with the remote system in question, the aggregation component may be utilized to determine a trend in detected anomalies. Here, the trend indicates that a new baseline in difference values is being established, and that the increase in anomalies to the new baseline is attributable to a false positive as described herein.

With respect to Scenario 4, the device identifier information from the user registry may indicate that Devices A, B, and C are associated with the given user account data. Additionally, the device identifier information from the remote system may indicate that Devices, D, E, and F are associated with the user account data. In this example, hash values may be generated for the device information associated with the user registry and the remote system, and those hash values may be analyzed to identify differences between the hash values. Here, the difference value may be 100, such as on a scale from 0 to 100, indicating a greater difference between hash values as compared to Scenarios 1, 2, and 3. This difference value may indicate that all of the devices associated with the user account as stored by the user registry differ from all of the devices associated with the user account as stored by the remote system. Additionally, when this anomaly information is aggregated with previous anomaly information associated with the remote system in question, the aggregation component may be utilized to determine a trend in detected anomalies. Here, the trend indicates a sudden increase in difference values, and that the increase indicates a systematic issue with reporting device-to-account associations.

Figure 3A:
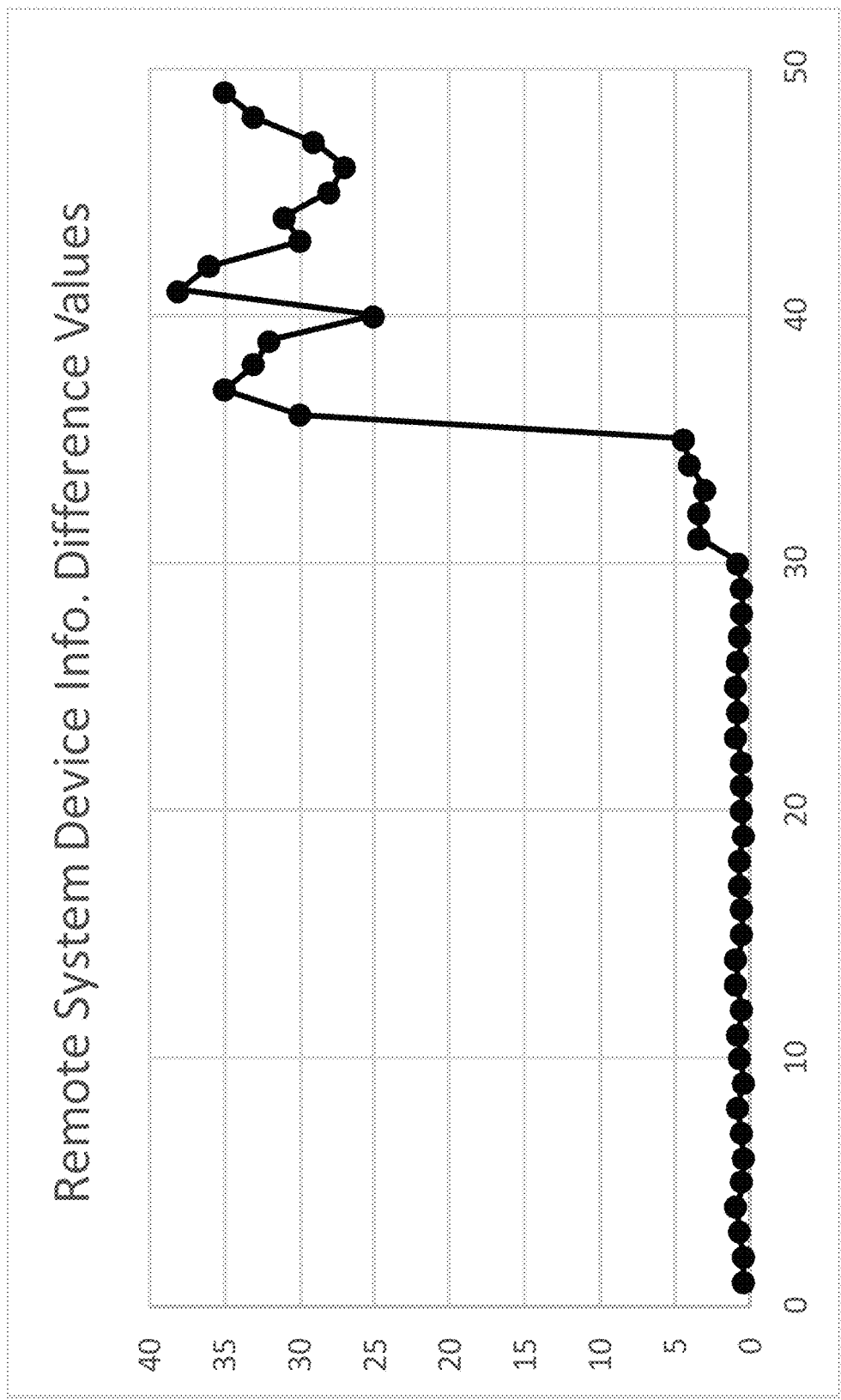
FIG. 3A illustrates an example chart showing changes in device identifier difference values over a period of time.

FIG. 3A illustrates an example chart showing changes in device identifier difference values over a period of time. The chart is an example showing difference values determined over 50 queries to a remote system. The 50 queries may represent one query per day and/or any other period of time between queries. The X-axis of the chart shows the query number. The Y-axis of the chart shows the difference value determined as described herein. For each query, device identifier information from the user registry and from the remote system may be analyzed to determine differences between such information, and the device-information analyzer may be utilized to determine the difference values as described herein. The chart shows aggregated difference values across some or all of the user accounts associated with a given remote system. For example, if the remote system is associated with 100,000 devices across hundreds or thousands of user accounts, the system may query the remote system for device identifier information for some or all of the devices associated with those user accounts.

As shown in FIG. 3A, for the remote system in question, the difference values for approximately the first 30 queries range from approximately 0 to approximately 2 on a scale from 0 to 100. Again, utilizing this example scale, difference values of 0 to 2 represent little if any differences between device identifier information stored at the remote system and device identifier information stored in the user registry. This shows that across the sampled user accounts and devices, few anomalies were detected.

With respect to queries 30 through approximately 35, the difference values range from approximately 3 to approximately 5, showing an increase in detected anomalies as compared to the prior 30 queries. Again, on a scale of 0 to 100, these difference values indicate slight differences. Such an occurrence may indicate that many new devices were purchased and associated with user account over the queried time period, such as when a sale on devices occurs, in association with holidays, etc. In these examples, a mitigating action may not be taken.

With respect to queries 35 through 50, the difference values range from approximately 25 to 40, showing a marked increase in detected anomalies as compared to the prior queries. This increase in detected anomalies and/or increase in severity of difference values associated with the detected anomalies may indicate that a systematic issue has occurred with respect to the remote system. In examples, these systematic issues may be caused by an update to the remote system, introduction of a new device for consumer user, computation errors, server errors, etc. In this example, a mitigating action as described herein may be taken to correct the anomalies that have been detected.

Figure 3B:
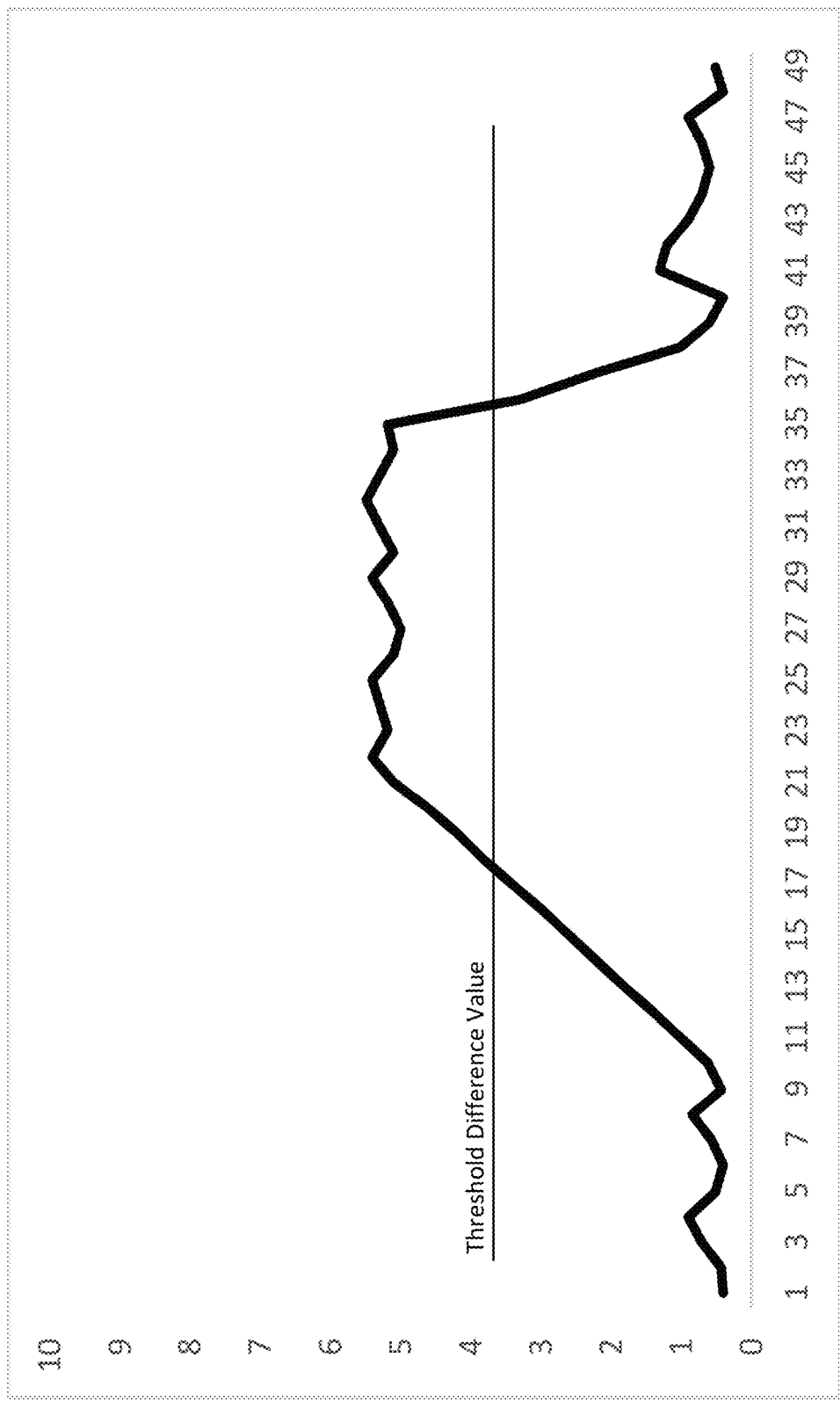
FIG. 3B illustrates an example chart showing aggregated device identifier difference values over time and the results of a corrective action being taken.

FIG. 3B illustrates an example chart showing aggregated device identifier difference values over time and the results of a corrective action being taken. The chart is an example showing difference values determined over 50 queries to a remote system. The 50 queries may represent one query per day and/or any other period of time between queries. The X-axis of the chart shows the query number. The Y-axis of the chart shows the difference value determined as described herein. For each query, device identifier information from the user registry and from the remote system may be analyzed to determine differences between such information, and the device-information analyzer may be utilized to determine the difference values as described herein. The chart shows aggregated difference values across some or all of the user accounts associated with a given remote system. For example, if the remote system is associated with 100,000 devices across hundreds or thousands of user accounts, the system may query the remote system for device identifier information for some or all of the devices associated with those user accounts.

As shown in FIG. 3B, during a period of time from around the 10th query to around the 20th query, the difference values steadily increase. This may indicate that reporting by the remote system has changed in some respect that is causing an increase in the anomalies detected as between device information stored in the user registry and device information reported from the remote system. Then from around the 20th query to around the 35th query, the difference values level off but are still higher than the baseline established in the first 10 queries. During this period of time, a mitigating action may be performed as described herein. The mitigating action may be determined and/or performed based at least in part on the difference values exceeding the threshold difference value and/or the difference values exceeding the threshold difference value for at least a given period of time. In examples, the mitigation action may include notifying the remote system of the aggregated anomalies and requesting that corrective action be taken. Operations at the remote system may take an action to correct reporting of device information. In these examples, the difference values may start to decrease, as shown between about query 35 and about query 39. Thereafter the difference values may return to about the original baseline.

Figure 3C:
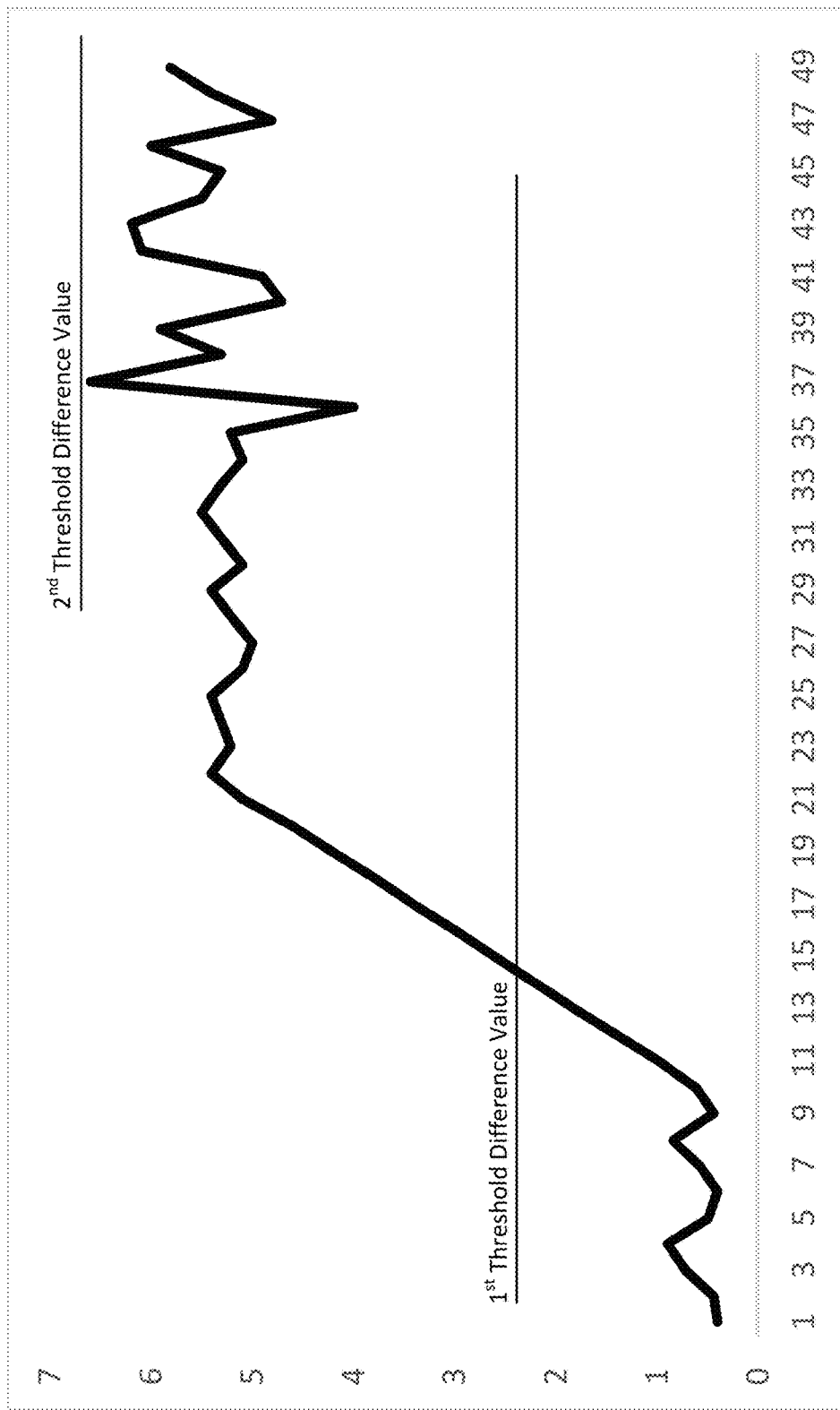
FIG. 3C illustrates an example chart showing aggregated device identifier difference values over time and the establishment of a new baseline based on the difference values being attributable to a false positive.

FIG. 3C illustrates an example chart showing aggregated device identifier difference values over time and the establishment of a new baseline based on the difference values being attributable to a false positive. The chart is an example showing difference values determined over 50 queries to a remote system. The 50 queries may represent one query per day and/or any other period of time between queries. The X-axis of the chart shows the query number. The Y-axis of the chart shows the difference value determined as described herein. For each query, device identifier information from the user registry and from the remote system may be analyzed to determine differences between such information, and the device-information analyzer may be utilized to determine the difference values as described herein. The chart shows aggregated difference values across some or all of the user accounts associated with a given remote system. For example, if the remote system is associated with 100,000 devices across hundreds or thousands of user accounts, the system may query the remote system for device identifier information for some or all of the devices associated with those user accounts.

As shown in FIG. 3C, during a period of time from around the 10th query to around the 20th query, the difference values steadily increase. This may indicate that reporting by the remote system has changed in some respect that is causing an increase in the anomalies detected as between device information stored in the user registry and device information reported from the remote system. Then from around the 20th query to around the 50th query, the difference values may be maintained about the threshold difference value. A mitigating action may be determined and/or performed based at least in part on the difference values exceeding the first threshold difference value and/or the difference values exceeding the first threshold difference value for at least a given period of time. In this example, the remote system may determine that the increase in the difference values is not attributable to a reporting error by the remote system, but is instead attributable to a false positive in detected anomalies. These false positives may be the result of differences between how devices are associated with accounts as between the system and the remote system. In these examples, a new threshold difference value may be determined, as shown in FIG. 3C. It should be understood that determination of threshold difference values may be performed for each, some, and/or all of the remote systems associated with the system, and the thresholds may differ as between remote systems. As such, the baselines discussed herein may be determined and/or changed dynamically with respect to each remote system.

Figure 4:
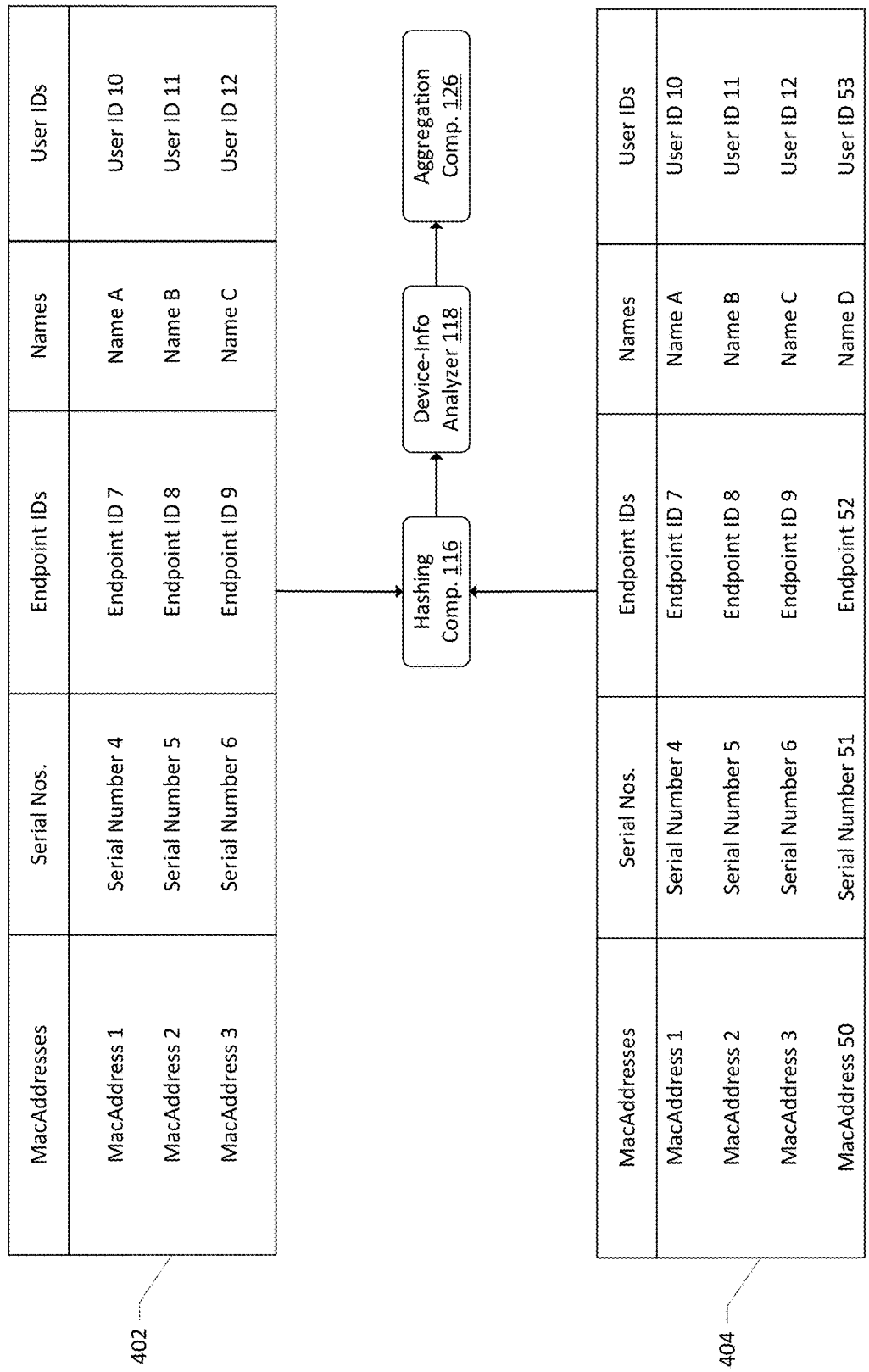
FIG. 4 illustrates a conceptual diagram of how device information from multiple systems may be analyzed to detect anomalies.

FIG. 4 illustrates a conceptual diagram of how device information from multiple systems may be analyzed to detect anomalies. As shown in FIG. 4, first device identifier information 402 stored in association with a user registry may be queried. Additionally, second device identifier information 404 stored in association with a remote system may be queried. For example, the first device identifier information 402 and/or the second device identifier information 404 may include MAC addresses, serial numbers, endpoint identifiers, naming indicators, and/or user identifiers as stored by the remote system. The MAC addresses may indicate the network interface controller designated for use by the device(s). The serial numbers may include the identifier of the device(s) as provided by the manufacturer of the device(s). The endpoint identifiers may indicate a unique identifier of the device(s) as provided by the remote system. The naming indicators may indicate the name of the device(s) as supplied by the remote system and/or by a user of the device, such as "bedroom light," etc. The user identifiers may indicate the user(s) associated with the device(s) and/or the user accounts associated with the device(s). The types of device identifier information presented above are provided by way of example and not as a limitation. It should be understood that additional or different device identifier types are also included in this disclosure.

The first device identifier information 402 and the second device identifier information 404 may be sent to a hashing component 116 for generating hash values representing the information. For example, locality-sensitive hashing may be utilized to generate a hash value for the device identifier information. In these examples, input data for the hashing component 116 may include the device identifier information received from the remote system. The hashing component 116 may then utilize the device identifier information to generate a hash value that represents the device identifier information. The hashing component 116 may also utilize device identifier information from the user registry to generate a hash value that represents that device identifier information. Here, utilizing locality-sensitive hashing, when the input to the hashing component 116 is consistent, the resulting hash value will be consistent. In other words, if the device identifier information from the remote system matches the device identifier information stored in the user registry, the hash values generated by the hashing component 116 will be the same. However, when an anomaly is present as between the device identifier information stored by the remote system and by the user registry, the hash values will differ. However, unlike other hash functions where hash collisions are minimized such that even small variations in input result in complete or nearly-complete differences in hash values, locality-sensitive hashing allows for hash collisions to be maximized. As such, when variations in input result, the quantity of differences can be determined from the resulting hash values. For example, when the device identifier information from the user registry indicates that Devices A, B, and C are associated with given user account data, but the device identifier information from the remote system indicates Devices A, B, C, and D are associated with the user account data, the resulting hash values will mostly correspond to each other but a slight variation representing the additional Device D will be present. By way of additional example, user registry information associating Devices A, B, and C with the user account data, and remote system information associating Devices A, B, and D with the user account data, will result in hash values with some similarities and some differences. In this example, the difference in hash values will be greater than the differences from the prior example because of both the addition of Device D and the missing Device C. By way of further example, user registry information associating Devices A, B, and C with the user account data, and remote system information associating Devices D, E, and F with the user account data, will result in completely different hash values.

Using FIG. 4 as an example, the second device identifier information 404 indicates that an extra device is associated with the user account data. As such, the hash values associated with the first device identifier information 402 and the second device identifier information 404 may be slightly different as described herein. It should be understood that while hashing is described herein as one method of comparing and quantifying differences between device identifier information stored between the user registry and the remote system, other methodologies are also included in this disclosure. For example, string matching, vectorizing, and/or data formatting techniques may be utilized. Generally, the techniques may include functionality that compares the device identifier information from the user registry and from the remote system to identify what data differs. The results of this analysis may then be utilized by the device-information analyzer 118 to quantify the detected anomaly.

For example, the device-information analyzer 118 may receive resulting data from the hashing component 116 and may be configured to analyze the hash values to generate a difference value that indicates the difference(s) between the hash values. By way of example, when the device identifier information stored by the user registry and by the remote system corresponds with each other, the hash values may be the same and the device-information analyzer 118 may generate data indicating that no difference is present. In examples, this data may be represented as a score, which may be associated with a scale. To illustrate, the scale may be from 0 to 100, with 0 indicating no difference between the device identifier information stored by the user registry 110 and the remote system, and 100 indicating complete difference between the information stored by the user registry and the remote system. When a slight variation is determined, such as when the user registry indicates Devices A, B, and C are associated with the user account data but the remote system indicates Devices, A, B, C, and D are associated with the user account data, the device-information analyzer 118 may analyze the hash values and produce a resulting score of 10, by way of example. In the example where the user registry indicates Devices A, B, and C are associated with the user account data, but the remote system indicates Devices A, B, and D are associated with the user account data, the device-information analyzer 118 may analyze the hash values and produce a resulting score of 20, by way of example. And when the user registry indicates Devices A, B, and C are associated with the user account data, but the remote system indicates Devices D, E, and F are associated with the user account data, the device-information analyzer 118 may analyze the hash values and produce a resulting score of 100, by way of example. It should be understood that the method of scoring and/or the scale described herein are provided by way of example and not as a limitation. The scoring may take any form and the scale may be of any type or value.

The difference values produced by the device-information analyzer 118 may be stored in a data store associated with the system. The difference values may be associated with an identifier of the remote system from which the device identifier information was received as well as other information associated with the analysis, such as the time when the analysis occurred, the user account data associated with the analysis, and/or any other information associated with the difference values.

In certain examples, actions may be taken based at least in part on the detected anomalies from one analysis of received device information from the remote system and the stored device information in the user registry. However, in other examples, actions may be taken based at least in part on an aggregation of anomalies associated with the remote system over a period of time. For example, an anomaly aggregation component 126 may be configured to retrieve difference values from the data store for a given remote system 104 and to aggregate the difference values, such as over a given period of time, to determine whether a corrective action should be taken. For example, if aggregation of the difference values over a period of time indicates less than a threshold number of detected anomalies and/or less than a threshold severity of detected anomalies, then the system may determine to refrain from taking a corrective action. However, when a rise in anomalies is detected, particularly when the rise in anomalies results in difference values satisfying a given threshold difference value, the anomaly aggregation component 126 may detect these results and the action component, as described more fully below; may be configured to take a corrective action.

In still other examples, the aggregation component 126 may be configured to detect not just a rise in difference values, but also baselines for anomalies associated with the remote system in question. For example, a given remote system may typically be associated with difference values between 0) and 5 on a scale of 0) to 100. The aggregation component 126 may be configured to utilizing this information to establish a baseline for the remote system 104 that is between, for example, 0 and 5. Additionally, certain remote systems may experience a rise in detected anomalies and/or anomaly severities but then the difference values may remain relatively constant. For example, the remote system 104 may have a baseline between 0) and 5, then experience a rise from 5 to 15, and then experience difference values between 15 and 20. The aggregation component 126 may be configured to detect these changes in difference values over time and establish a new baseline of between 15 and 20. The aggregation component 126 may establish the new baseline when, for example, the remote system sends data indicating that the increase in difference values is attributable to a false-positive, which may be caused by a delay in reporting new devices, removed devices, and/or a change in the way that device information is stored. In these examples, while the remote system's device information may differ from the device information stored in the user registry, those differences do not correspond to improperly associating devices with user accounts. As such, the new baseline may be established and utilized for determining whether to take corrective actions based on subsequent detected anomalies.

The aggregation component 126 may also be utilized to confirm that detected anomalies decrease after a corrective action is taken by the system and/or the remote system. For example, when the difference values satisfy a threshold difference value, such as for a given period of time, a corrective action may be taken as outlined elsewhere herein. Thereafter, the aggregation component 126 may monitor difference values associated with the remote system and determine whether the difference values start to decrease, such as within a given amount of time. If the difference values decrease, such as below the threshold difference value, then no additional corrective action may be taken and/or a notification may be sent to the remote system 104 indicating that the issue has been mitigated. However, in instances where the difference values do not start to decrease and/or do not decrease below the threshold difference value, the system may take additional corrective actions to mitigate the device-to-account anomalies.

Figure 5:
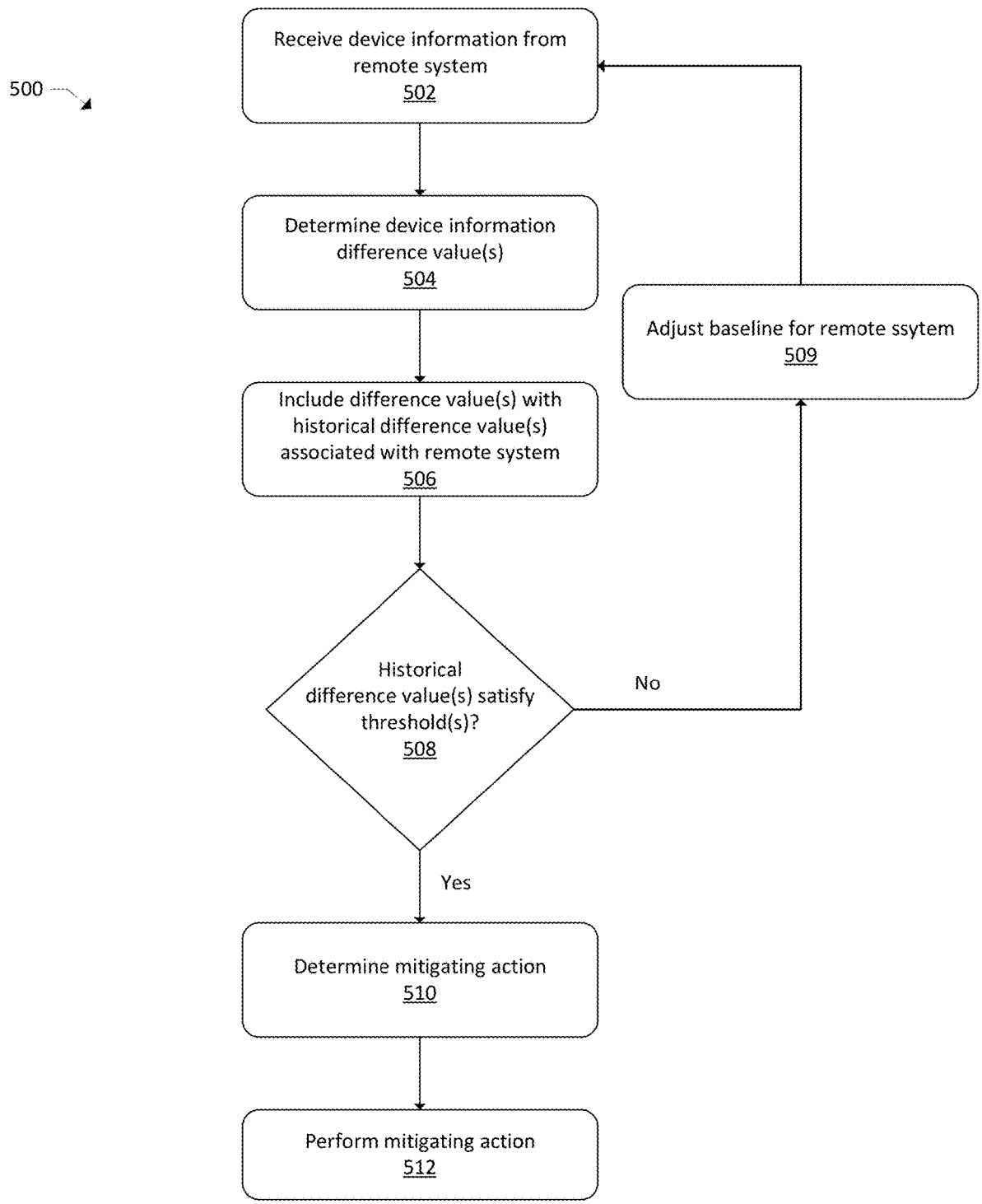
FIG. 5 illustrates a flow diagram of an example process for utilizing historical difference values associated with a remote system to determine when to take corrective action.

FIG. 5 illustrates processes for device-to-account anomaly detection. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4 and 6-12, although the processes may be implemented in a wide variety of other environments, architectures and systems.

FIG. 5 illustrates a flow diagram of an example process 500 for utilizing historical difference values associated with a remote system to determine when to take corrective action. The order in which the operations or steps are described is not intended to be construed as a limitation, and any number of the described operations may be combined in any order and/or in parallel to implement process 500.

At block 502, the process 500 may include receiving device information from a remote system. For example, a query component of the system may be configured to query the one or more remote systems for device identifier information. For example, the query component may query the remote systems on a periodic, scheduled, or directed basis. By way of example, the query component may query the remote systems once every 24 hours, and/or at a certain time of day and/or day of the week. The query component may also query the remote systems based at least in part on user input. For example, when a user adds a new device to a user account, this occurrence may trigger the query component to request device identifier information from the remote system associated with the new device. It should be understood that one or more other trigger events for querying the remote system are contemplated and included in this disclosure.

The system may receive the device identifier information from the remote system that was queried. The device identifier information may include any information that identifies or is otherwise associated with devices that the remote system has associated with the user account at issue. For example, the device identifier information may include MAC addresses, serial numbers, endpoint identifiers, naming indicators, and/or user identifiers as stored by the remote system. The MAC addresses may indicate the network interface controller designated for use by the device(s). The serial numbers may include the identifier of the device(s) as provided by the manufacturer of the device(s). The endpoint identifiers may indicate a unique identifier of the device(s) as provided by the remote system. The naming indicators may indicate the name of the device(s) as supplied by the remote system and/or by a user of the device, such as "bedroom light," etc. The user identifiers may indicate the user(s) associated with the device(s) and/or the user accounts associated with the device(s). The types of device identifier information presented above are provided by way of example and not as a limitation. It should be understood that additional or different device identifier types are also included in this disclosure.

At block 504, the process 500 may include determining one or more device information difference values. For example, once the device identifier information is acquired from the remote system, a hashing component may be configured to generate hash values representing the device identifier information. For example, locality-sensitive hashing may be utilized to generate a hash value for the device identifier information. In these examples, input data for the hashing component may include the device identifier information received from the remote system. The hashing component may then utilize the device identifier information to generate a hash value that represents the device identifier information. The hashing component may also utilize device identifier information from the user registry to generate a hash value that represents that device identifier information. Here, utilizing locality-sensitive hashing, when the input to the hashing component is consistent, the resulting hash value will be consistent. In other words, if the device identifier information from the remote system matches the device identifier information stored in the user registry, the hash values generated by the hashing component will be the same. However, when an anomaly is present as between the device identifier information stored by the remote system and by the user registry, the hash values will differ. However, unlike other hash functions where hash collisions are minimized such that even small variations in input result in complete or nearly-complete differences in hash values, locality-sensitive hashing allows for hash collisions to be maximized. As such, when variations in input result, the quantity of differences can be determined from the resulting hash values. For example, when the device identifier information from the user registry indicates that Devices A, B, and C are associated with given user account data, but the device identifier information from the remote system indicates Devices A, B, C, and D are associated with the user account data, the resulting hash values will mostly correspond to each other but a slight variation representing the additional Device D will be present. By way of additional example, user registry information associating Devices A, B, and C with the user account data, and remote system information associating Devices A, B, and D with the user account data, will result in hash values with some similarities and some differences. In this example, the difference in hash values will be greater than the differences from the prior example because of both the addition of Device D and the missing Device C. By way of further example, user registry information associating Devices A, B, and C with the user account data, and remote system information associating Devices D, E, and F with the user account data, will result in completely different hash values.

It should be understood that while hashing is described herein as one method of comparing and quantifying differences between device identifier information stored between the user registry and the remote system, other methodologies are also included in this disclosure. For example, string matching, vectorizing, and/or data formatting techniques may be utilized. Generally, the techniques may include functionality that compares the device identifier information from the user registry and from the remote system to identify what data differs. The results of this analysis may then be utilized by the device-information analyzer to quantify the detected anomaly.

At block 506, the process 500 may include including the one or more difference values in historical difference values associated with the remote system. For example, the difference values produced by the device-information analyzer may be stored in a data store associated with the system. The difference values may be associated with an identifier of the remote system from which the device identifier information was received as well as other information associated with the analysis, such as the time when the analysis occurred, the user account data associated with the analysis, and/or any other information associated with the difference values.

At block 508, the process 500 may include determining whether the historical difference values satisfy one or more thresholds. For example, an action component may determine that the historical difference values satisfy one or more thresholds for taking certain actions. For example, the thresholds may include a certain number of detected anomalies, a certain number of detected anomalies having a difference value above a given threshold value, a certain rate of detected anomalies, etc. In these examples, the detected anomalies may indicate a more systematic problem with how the remote system stores device identifier information and/or an error in communicating device identifier information as between the system and the remote system.

In instances where the historical difference values do not satisfy the one or more thresholds, the process 500 may proceed back to block 502 where no corrective action is taken and additional device identifying information is received and analyzed to detect device-to-account anomalies. In other words, no anomalies may be detected and/or the detected anomalies may be sufficiently minor as to not warrant corrective action.

In other examples, where the historical difference values do not satisfy the one or more thresholds, the process 500 may proceed to block 509 where a baseline associated with the remote system may be adjusted. For example, difference values determined for a given remote system may be stored in the data store over time. A baseline for the remote system may be established utilizing these stored difference values. When the historical difference values do not satisfy one or more of the thresholds indicating that device-to-account associations are inaccurately reported from the remote system, the baseline may be adjusted, such as a downward adjustment to more accurately represent typical difference values associated with the remote system.

In instances where the historical difference values satisfy at least one of the one or more thresholds, the process 500 may include, at block 510, determining a mitigating action to take. For example, the action component may select an action to mitigate the anomalies, such as instructing the remote system to fix the problem, temporarily or permanently stopping use of the remote system by users, notifying users of the problem, etc.

At block 512, the process 500 may include performing the mitigating action. Performing the mitigating action may include, for example, generating and sending notification data, generating and sending a command to cause the devices associated with the user account to operate in a given manner, generating and sending a command to cause the remote system to perform an action, and/or causing functionality associated with the remote system to be disabled.

Figure 6:
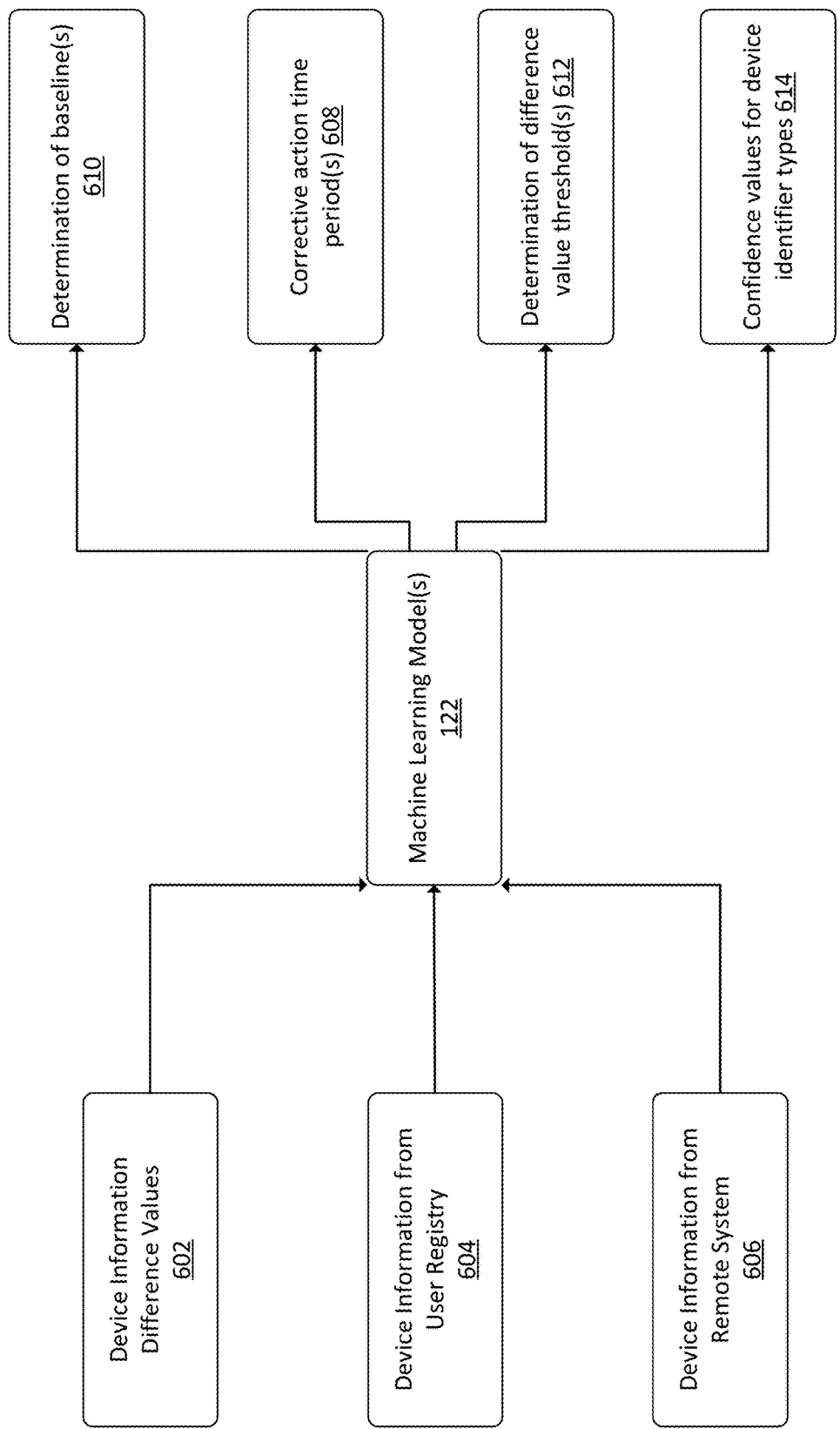
FIG. 6 illustrates a conceptual diagram of components utilized for determining a likely cause of detected anomalies and utilizing that information to select an action to be performed.

FIG. 6 illustrates a conceptual diagram of components utilized for determining a likely cause of detected anomalies and utilizing that information to select an action to be performed. The component of FIG. 6 may be the same or similar to those described with respect to FIG. 1, including, for example, the device information difference values 602, the device information from the user registry 604, the device information from the remote system 606, the one or more machine learning models 122, and/or the actions 608.

As shown in FIG. 6, the machine learning models 122, trained as described herein, may be utilized to determine what action(s) are to be taken to correct detected anomalies with respect to a given remote system. For example, the device information difference values 602, the device information from the user registry 604, the device information from the remote system 606 may be utilized as input data to the machine learning models 122, which may be trained as described herein. The machine learning models 122 may utilize this input data to generate results data indicating a likely cause of the detected anomalies as well as a confidence score associated with the results data. Based at least in part on the determined cause and/or the confidence score, the machine learning models 122 may identify an action associated with the cause that is determined to mitigate negative consequences of the anomaly. This information may be provided to the action component 120 for selecting an action as described herein.

The machine learning models 122 as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether a given event caused an anomaly and/or whether a given action will mitigate the anomaly. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence. The machine learning models 122 may be trained utilizing some of all of the data described herein to produce trained machine learning models, that may be utilized as described herein.

The one or more actions 608 may be selected based at least in part on the results of from the machine learning models 122. For example, when the machine learning models 122 determine that a cause of detected anomalies is likely that a coding error has been introduced with respect to the remote system, the selected action may include sending a notification to the remote system that identifies the error, provides instructions for correcting the error, and/or indicates consequences for not correcting the error. By way of further example, if the cause of detected anomalies is latency in the remote system registering newly-associated devices, the selected action may include sending a notification to the remote system that identifies the issue and requests corrective action to minimize the latency. These actions and causes are provided by way of example, and not as a limitation.

Additionally, the machine learning models 122 may be utilized to determine one or more difference value baselines 610 to associate with a given remote system and/or one or more difference value thresholds 612 to associate with the remote system. For example, the baselines may be determined and utilized for identifying when a rise in difference values above the baseline starts to occur, and the threshold difference values may be utilized to determine when a corrective action may be taken. Also, when a false positive is determined, the machine learning models 122 may be configured to determine what a new threshold difference value should be for a given remote system.

The outputs from the machine learning models 122 may also include confidence values associated with the various device identifier types utilized for determining differences between device information stored by the user registry and device information reported by the remote system. For example, the device information may include different types of information such as MAC addresses, serial numbers, naming indicators, user account identifiers, endpoint identifiers, etc. While these and other types of device identifiers may be utilized for comparison between what information is stored in the user registry and what information is reported by the remote system, some of these device identifier types may be more indicative of problematic device-to-account anomalies than other types. By way of example, the machine learning models 122 may by utilized to determine what device identifier types differ when device-to-account anomalies are detected and to determine what device identifier types are present when the differences indicate a problematic situation with the remote system, such as when corrective action is taken.

FIGS. 7-10 illustrate processes for device-to-account anomaly detection. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6, 11, and 12, although the processes may be implemented in a wide variety of other environments, architectures and systems.

Figure 7:
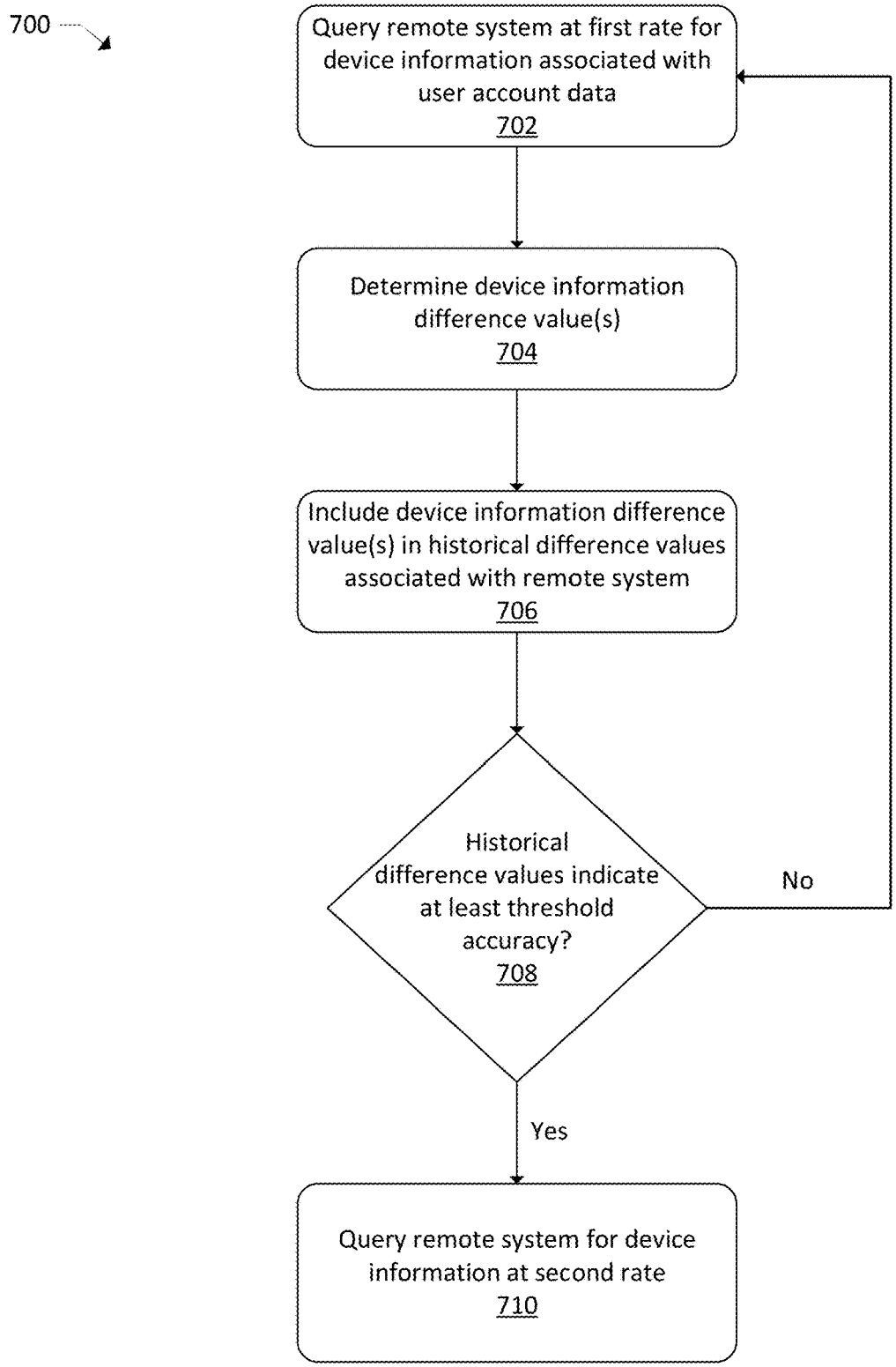
FIG. 7 illustrates a flow diagram of an example process for determining a rate at which to query a remote system for device identifier information for device-to-account anomaly detection.

FIG. 7 illustrates a flow diagram of an example process 700 for determining a rate at which to query a remote system for device identifier information for device-to-account anomaly detection. The order in which the operations or steps are described is not intended to be construed as a limitation, and any number of the described operations may be combined in any order and/or in parallel to implement process 700.

At block 702, the process 700 may include querying a remote system at a first rate for device information associated with user account data. For example, a query component of the system may be configured to query the one or more remote systems for device identifier information. For example, the query component may query the remote systems on a periodic, scheduled, or directed basis. By way of example, the query component may query the remote systems once every 24 hours, and/or at a certain time of day and/or day of the week. The query component may also query the remote systems based at least in part on user input. For example, when a user adds a new device to a user account, this occurrence may trigger the query component to request device identifier information from the remote system associated with the new device. It should be understood that one or more other trigger events for querying the remote system are contemplated and included in this disclosure.

The system may receive the device identifier information from the remote system that was queried. The device identifier information may include any information that identifies or is otherwise associated with devices that the remote system has associated with the user account at issue. For example, the device identifier information may include MAC addresses, serial numbers, endpoint identifiers, naming indicators, and/or user identifiers as stored by the remote system. The MAC addresses may indicate the network interface controller designated for use by the device(s). The serial numbers may include the identifier of the device(s) as provided by the manufacturer of the device(s). The endpoint identifiers may indicate a unique identifier of the device(s) as provided by the remote system. The naming indicators may indicate the name of the device(s) as supplied by the remote system and/or by a user of the device, such as "bedroom light," etc. The user identifiers may indicate the user(s) associated with the device(s) and/or the user accounts associated with the device(s). The types of device identifier information presented above are provided by way of example and not as a limitation. It should be understood that additional or different device identifier types are also included in this disclosure. When queried on a periodic and/or scheduled basis, the querying may be dynamic and/or may be based at least in part on historical accuracy of stored device identifier information associated with a given remote system.

At block 704, the process 700 may include determining one or more device information difference values. For example, once the device identifier information is acquired from the remote system, a hashing component may be configured to generate hash values representing the device identifier information. For example, locality-sensitive hashing may be utilized to generate a hash value for the device identifier information. In these examples, input data for the hashing component may include the device identifier information received from the remote system. The hashing component may then utilize the device identifier information to generate a hash value that represents the device identifier information. The hashing component may also utilize device identifier information from the user registry to generate a hash value that represents that device identifier information. Here, utilizing locality-sensitive hashing, when the input to the hashing component is consistent, the resulting hash value will be consistent. In other words, if the device identifier information from the remote system matches the device identifier information stored in the user registry, the hash values generated by the hashing component will be the same. However, when an anomaly is present as between the device identifier information stored by the remote system and by the user registry, the hash values will differ. However, unlike other hash functions where hash collisions are minimized such that even small variations in input result in complete or nearly-complete differences in hash values, locality-sensitive hashing allows for hash collisions to be maximized. As such, when variations in input result, the quantity of differences can be determined from the resulting hash values. For example, when the device identifier information from the user registry indicates that Devices A, B, and C are associated with given user account data, but the device identifier information from the remote system indicates Devices A, B, C, and D are associated with the user account data, the resulting hash values will mostly correspond to each other but a slight variation representing the additional Device D will be present. By way of additional example, user registry information associating Devices A, B, and C with the user account data, and remote system information associating Devices A, B, and D with the user account data, will result in hash values with some similarities and some differences. In this example, the difference in hash values will be greater than the differences from the prior example because of both the addition of Device D and the missing Device C. By way of further example, user registry information associating Devices A, B, and C with the user account data, and remote system information associating Devices D, E, and F with the user account data, will result in completely different hash values.

It should be understood that while hashing is described herein as one method of comparing and quantifying differences between device identifier information stored between the user registry and the remote system, other methodologies are also included in this disclosure. For example, string matching, vectorizing, and/or data formatting techniques may be utilized. Generally, the techniques may include functionality that compares the device identifier information from the user registry and from the remote system to identify what data differs. The results of this analysis may then be utilized by the device-information analyzer to quantify the detected anomaly.

At block 706, the process 700 may include including the device information difference values in historical difference values associated with the remote system. For example, the difference values produced by the device-information analyzer may be stored in a data store associated with the system. The difference values may be associated with an identifier of the remote system from which the device identifier information was received as well as other information associated with the analysis, such as the time when the analysis occurred, the user account data associated with the analysis, and/or any other information associated with the difference values.

At block 708, the process 700 may include determining whether the historical difference values indicate at least a threshold accuracy. For example, the threshold accuracy may include the historical difference values, collectively, being less than a given difference value, such as less than 10. In other examples, the threshold accuracy may include the detection of less than a threshold number of anomalies. In other examples, the threshold accuracy may include the detection of anomalies associated with less than a threshold number of user accounts. Additional measures of accuracy may also be utilized.

In instances where the historical difference values do not indicate at least the threshold accuracy, the process 700 may proceed back to block 702 where the remote system may queried for device information at the first rate. In these examples, the accuracy of the remote system is such that continued querying of the remote system at the current rate is desirable to ascertain whether detected anomalies should be addressed with one or more actions.

In instances where the historical difference values indicate that least the threshold accuracy, the process 700 may include, at block 710, querying the remote system for device information at a second rate that differs from the first rate. For example, when the historical difference values for a given remote system satisfy a threshold that indicates the remote system generally stores device identifier information accurately, the rate component may determine that the remote system should be queried less frequently than other remote systems. For example, the remote system may be queried every 48 hours instead of every 24 hours. In other examples where the historical difference values indicate the remote system generally does not store device identifier information accurately, and/or when a given action has been performed to mitigate anomalies as described herein, the rate component may determine that the remote system should be queried more frequently than other remote systems. For example, the remote system should be queried every 12 hours instead of every 24 hours.

Figure 8:
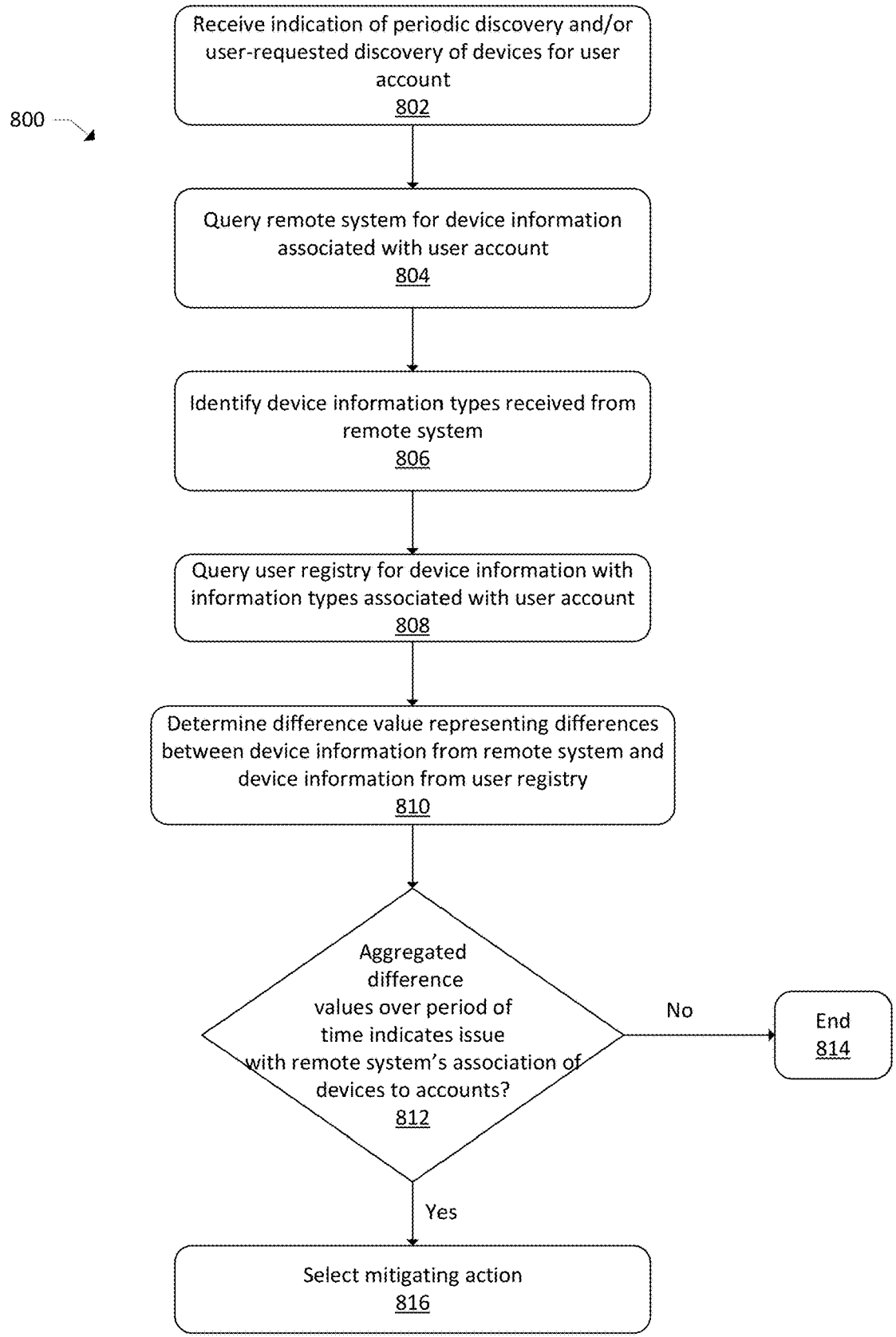
FIG. 8 illustrates a flow diagram of an example process for identifying trigger events and input types associated with device-to-account anomaly detection.

FIG. 8 illustrates a flow diagram of an example process 800 for identifying trigger events associated with device-to-account anomaly detection. The order in which the operations or steps are described is not intended to be construed as a limitation, and any number of the described operations may be combined in any order and/or in parallel to implement process 800.

At block 802, the process 800 may include receiving an indication of periodic discovery and/or user-requested discovery of devices for a user account. For example, a query component of the system may be configured to query the one or more remote systems for device identifier information. For example, the query component may query the remote systems on a periodic, scheduled, or directed basis. By way of example, the query component may query the remote systems once every 24 hours, and/or at a certain time of day and/or day of the week. The query component may also query the remote systems based at least in part on user input. For example, when a user adds a new device to a user account, this occurrence may trigger the query component to request device identifier information from the remote system associated with the new device. It should be understood that one or more other trigger events for querying the remote system are contemplated and included in this disclosure. In the example of FIG. 8, the trigger event for querying remote systems may include querying the remote systems when "silent discovery" is performed, or in other words when the system attempts to discover newly-added devices to the user account. Additionally, the trigger event may include querying the remote system when "on-demand discovery" is performed, or in other words when a user requests that the system discover a newly-added device.

At block 804, the process 800 may include querying a remote system for device information associated with the user account. For example, a query component of the system may be configured to query the one or more remote systems for device identifier information. For example, the query component may query the remote systems on a periodic, scheduled, or directed basis. By way of example, the query component may query the remote systems once every 24 hours, and/or at a certain time of day and/or day of the week. The query component may also query the remote systems based at least in part on user input. For example, when a user adds a new device to a user account, this occurrence may trigger the query component to request device identifier information from the remote system associated with the new device. It should be understood that one or more other trigger events for querying the remote system are contemplated and included in this disclosure.

The system may receive the device identifier information from the remote system that was queried. The device identifier information may include any information that identifies or is otherwise associated with devices that the remote system has associated with the user account at issue. For example, the device identifier information may include MAC addresses, serial numbers, endpoint identifiers, naming indicators, and/or user identifiers as stored by the remote system. The MAC addresses may indicate the network interface controller designated for use by the device(s). The serial numbers may include the identifier of the device(s) as provided by the manufacturer of the device(s). The endpoint identifiers may indicate a unique identifier of the device(s) as provided by the remote system. The naming indicators may indicate the name of the device(s) as supplied by the remote system and/or by a user of the device, such as "bedroom light," etc. The user identifiers may indicate the user(s) associated with the device(s) and/or the user accounts associated with the device(s). The types of device identifier information presented above are provided by way of example and not as a limitation. It should be understood that additional or different device identifier types are also included in this disclosure. When queried on a periodic and/or scheduled basis, the querying may be dynamic and/or may be based at least in part on historical accuracy of stored device identifier information associated with a given remote system.

At block 806, the process 800 may include identifying device information types received from the remote system. For example, the remote system may send device identifier information including all of the device identifier types noted above. However, in other examples, the remote system may only send some of the device identifier types. The received device identifier types may be identified.

At block 808, the process 800 may include querying a user registry for device information with the information types associated with the user account. For example, instead of querying the user registry for all device identifier information associated with all of the device identifier types, the user registry may be queried for only the device identifier types received from the remote system. This may allow for a like comparison to be made in later operations. Additionally, in instances where a remote system typically sends certain device identifier types but in a given instance only sends a fraction of the typically-sent types, and/or sends other types that it typically does not send, the system may identify this occurrence.

At block 810, the process 800 may include determining one or more difference values representing differences between device information from the remote system and device information from the user registry. For example, once the device identifier information is acquired from the remote system, a hashing component may be configured to generate hash values representing the device identifier information. For example, locality-sensitive hashing may be utilized to generate a hash value for the device identifier information. In these examples, input data for the hashing component may include the device identifier information received from the remote system. The hashing component may then utilize the device identifier information to generate a hash value that represents the device identifier information. The hashing component may also utilize device identifier information from the user registry to generate a hash value that represents that device identifier information. Here, utilizing locality-sensitive hashing, when the input to the hashing component is consistent, the resulting hash value will be consistent. In other words, if the device identifier information from the remote system matches the device identifier information stored in the user registry, the hash values generated by the hashing component will be the same. However, when an anomaly is present as between the device identifier information stored by the remote system and by the user registry, the hash values will differ. However, unlike other hash functions where hash collisions are minimized such that even small variations in input result in complete or nearly-complete differences in hash values, locality-sensitive hashing allows for hash collisions to be maximized. As such, when variations in input result, the quantity of differences can be determined from the resulting hash values. For example, when the device identifier information from the user registry indicates that Devices A, B, and C are associated with given user account data, but the device identifier information from the remote system indicates Devices A, B, C, and D are associated with the user account data, the resulting hash values will mostly correspond to each other but a slight variation representing the additional Device D will be present. By way of additional example, user registry information associating Devices A, B, and C with the user account data, and remote system information associating Devices A, B, and D with the user account data, will result in hash values with some similarities and some differences. In this example, the difference in hash values will be greater than the differences from the prior example because of both the addition of Device D and the missing Device C. By way of further example, user registry information associating Devices A, B, and C with the user account data, and remote system information associating Devices D, E, and F with the user account data, will result in completely different hash values.

It should be understood that while hashing is described herein as one method of comparing and quantifying differences between device identifier information stored between the user registry and the remote system, other methodologies are also included in this disclosure. For example, string matching, vectorizing, and/or data formatting techniques may be utilized. Generally, the techniques may include functionality that compares the device identifier information from the user registry and from the remote system to identify what data differs. The results of this analysis may then be utilized by the device-information analyzer to quantify the detected anomaly.

At block 812, the process 800 may include determining whether the difference value(s) indicate an issue with the remote system's association of devices to accounts. For example, the device-information analyzer may receive resulting data from the hashing component and may be configured to analyze the hash values to generate a difference value that indicates the difference(s) between the hash values. By way of example, when the device identifier information stored by the user registry and by the remote system corresponds with each other, the hash values may be the same and the device-information analyzer may generate data indicating that no difference is present. In examples, this data may be represented as a score, which may be associated with a scale. To illustrate, the scale may be from 0 to 100, with 0 indicating no difference between the device identifier information stored by the user registry and the remote system, and 100 indicating complete difference between the information stored by the user registry and the remote system. When a slight variation is determined, such as when the user registry indicates Devices A, B, and C are associated with the user account data but the remote system indicates Devices, A, B, C, and D are associated with the user account data, the device-information analyzer may analyze the hash values and produce a resulting score of 10, by way of example. In the example where the user registry indicates Devices A, B, and C are associated with the user account data, but the remote system indicates Devices A, B, and D are associated with the user account data, the device-information analyzer may analyze the hash values and produce a resulting score of 20, by way of example. And when the user registry indicates Devices A, B, and C are associated with the user account data, but the remote system indicates Devices D, E, and F are associated with the user account data, the device-information analyzer may analyze the hash values and produce a resulting score of 100, by way of example.

In certain examples, actions may be taken based at least in part on the detected anomalies from one analysis of received device information from the remote system and the stored device information in the user registry. However, in other examples, actions may be taken based at least in part on an aggregation of anomalies associated with the remote system over a period of time. For example, an aggregation component may be configured to retrieve difference values from the data store for a given remote system and to aggregate the difference values, such as over a given period of time, to determine whether a corrective action should be taken. For example, if aggregation of the difference values over a period of time indicates less than a threshold number of detected anomalies and/or less than a threshold severity of detected anomalies, then the system may determine to refrain from taking a corrective action. However, when a rise in anomalies is detected, particularly when the rise in anomalies results in difference values satisfying a given threshold difference value, the aggregation component may detect these results and an action component, as described more fully below; may be configured to take a corrective action.

In still other examples, the aggregation component may be configured to detect not just a rise in difference values, but also baselines for anomalies associated with the remote system in question. For example, a given remote system may typically be associated with difference values between 0 and 5 on a scale of 0 to 100. The aggregation component may be configured to utilizing this information to establish a baseline for the remote system that is between, for example, 0 and 5. Additionally, certain remote systems may experience a rise in detected anomalies and/or anomaly severities but then the difference values may remain relatively constant. For example, the remote system may have a baseline between 0 and 5, then experience a rise from 5 to 15, and then experience difference values between 15 and 20. The aggregation component may be configured to detect these changes in difference values over time and establish a new baseline of between 15 and 20. The aggregation component may establish the new baseline when, for example, the remote system sends data indicating that the increase in difference values is attributable to a false-positive, which may be caused by a delay in reporting new devices, removed devices, and/or a change in the way that device information is stored. In these examples, while the remote system's device information may differ from the device information stored in the user registry, those differences do not correspond to improperly associating devices with user accounts. As such, the new baseline may be established and utilized for determining whether to take corrective actions based on subsequent detected anomalies.

The aggregation component may also be utilized to confirm that detected anomalies decrease after a corrective action is taken by the system and/or the remote system. For example, when the difference values satisfy a threshold difference value, such as for a given period of time, a corrective action may be taken as outlined elsewhere herein. Thereafter, the aggregation component may monitor difference values associated with the remote system and determine whether the difference values start to decrease, such as within a given amount of time. If the difference values decrease, such as below the threshold difference value, then no additional corrective action may be taken and/or a notification may be sent to the remote system indicating that the issue has been mitigated. However, in instances where the difference values do not start to decrease and/or do not decrease below the threshold difference value, the system may take additional corrective actions to mitigate the device-to-account anomalies.

In instances where the difference value(s) do not indicate an issue with the remote system's association of devices to accounts, the process 800 may end at block 814. In these examples, no anomalies may be detected or the detected anomalies may not be sufficiently severe to merit taking action.

In instances where the difference value(s) indicate an issue with the remote system's association of devices to accounts, the process 800 may include, at block 816, selecting a mitigation action to be performed. For example, an action component of the system may be configured to utilize the difference values and/or historical difference values as stored in the data store to determine whether an action should be taken, such as an action to mitigate the anomalies detected as between device identifier information stored by the user registry and by the remote system. For example, the action component may determine that the historical difference values indicate the remote system stores device identifier information accurately, but that, for a given user account, anomalies have been detected. In these examples, the action component may select an action such as notifying the remote system that the anomaly has been detected with respect to the user account in question. In other examples, the action component may determine that the detected anomalies correspond to a given event, such as when a user adds a new device to the user account. In these examples, the anomaly may indicate a delay in association of the new device with the user account data, either by the remote system or by the user registry. In these examples, the action may include refraining from sending any notification and/or taking other types of mitigating action. Instead, the action may include waiting a period of time before querying the remote system for updated device identifier information. In still other examples, the action component may determine that the historical difference values satisfy one or more thresholds for taking certain actions. For example, the thresholds may include a certain number of detected anomalies, a certain number of detected anomalies having a difference value above a given threshold value, a certain rate of detected anomalies, etc. In these examples, the detected anomalies may indicate a more systematic problem with how the remote system stores device identifier information and/or an error in communicating device identifier information as between the system and the remote system. In these examples, the action component may select an action to mitigate the anomalies, such as instructing the remote system to fix the problem, temporarily or permanently stopping use of the remote system by users, notifying users of the problem, etc.

Figure 9:
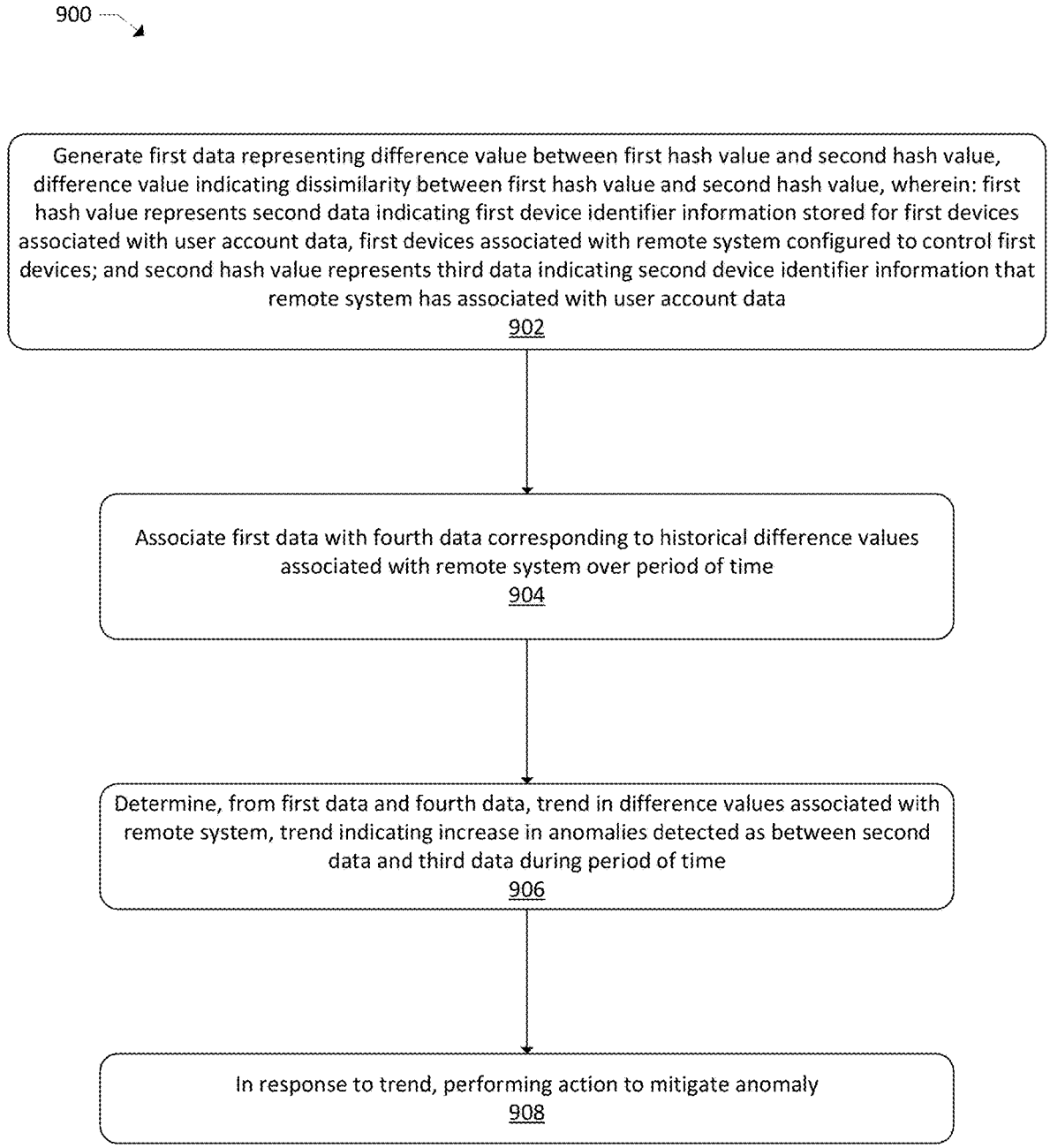
FIG. 9 illustrates a flow diagram of an example process for device-to-account anomaly detection.

FIG. 9 illustrates a flow diagram of an example process 900 for device-to-account anomaly detection. The order in which the operations or steps are described is not intended to be construed as a limitation, and any number of the described operations may be combined in any order and/or in parallel to implement process 900.

At block 902, the process 900 may include generating first data representing a difference value between a first hash value and a second hash value, the difference value indicating a dissimilarity between the first hash value and the second hash value, wherein: the first hash value represents second data indicating first device identifier information stored for first devices associated with user account data, the first devices associated with a remote system configured to control the first devices; and the second hash value represents third data indicating second device identifier information that the remote system has associated with the user account data. For example, device identifier information may be stored in a user registry of a system associated with voice interface devices. A query component may query the remote systems on a periodic, scheduled, or directed basis. By way of example, the query component may query the remote systems once every 24 hours, and/or at a certain time of day and/or day of the week. The query component may also query the remote systems based at least in part on user input. For example, when a user adds a new device to a user account, this occurrence may trigger the query component to request device identifier information from the remote system associated with the new device. It should be understood that one or more other trigger events for querying the remote system are contemplated and included in this disclosure.

The system may receive the device identifier information from the remote system that was queried. The device identifier information may include any information that identifies or is otherwise associated with devices that the remote system has associated with the user account at issue. For example, the device identifier information may include MAC addresses, serial numbers, endpoint identifiers, naming indicators, and/or user identifiers as stored by the remote system. The MAC addresses may indicate the network interface controller designated for use by the device(s). The serial numbers may include the identifier of the device(s) as provided by the manufacturer of the device(s). The endpoint identifiers may indicate a unique identifier of the device(s) as provided by the remote system. The naming indicators may indicate the name of the device(s) as supplied by the remote system and/or by a user of the device, such as "bedroom light," etc. The user identifiers may indicate the user(s) associated with the device(s) and/or the user accounts associated with the device(s). The types of device identifier information presented above are provided by way of example and not as a limitation. It should be understood that additional or different device identifier types are also included in this disclosure.

Once the device identifier information is acquired from the remote system, a hashing component may be configured to generate hash values representing the device identifier information. For example, locality-sensitive hashing may be utilized to generate a hash value for the device identifier information. In these examples, input data for the hashing component may include the device identifier information received from the remote system. The hashing component may then utilize the device identifier information to generate a hash value that represents the device identifier information. The hashing component may also utilize device identifier information from the user registry to generate a hash value that represents that device identifier information. Here, utilizing locality-sensitive hashing, when the input to the hashing component is consistent, the resulting hash value will be consistent. In other words, if the device identifier information from the remote system matches the device identifier information stored in the user registry, the hash values generated by the hashing component will be the same. However, when an anomaly is present as between the device identifier information stored by the remote system and by the user registry, the hash values will differ. However, unlike other hash functions where hash collisions are minimized such that even small variations in input result in complete or nearly-complete differences in hash values, locality-sensitive hashing allows for hash collisions to be maximized. As such, when variations in input result, the quantity of differences can be determined from the resulting hash values. For example, when the device identifier information from the user registry indicates that Devices A, B, and C are associated with given user account data, but the device identifier information from the remote system indicates Devices A, B, C, and D are associated with the user account data, the resulting hash values will mostly correspond to each other but a slight variation representing the additional Device D will be present. By way of additional example, user registry information associating Devices A, B, and C with the user account data, and remote system information associating Devices A, B, and D with the user account data, will result in hash values with some similarities and some differences. In this example, the difference in hash values will be greater than the differences from the prior example because of both the addition of Device D and the missing Device C. By way of further example, user registry information associating Devices A, B, and C with the user account data, and remote system information associating Devices D, E, and F with the user account data, will result in completely different hash values.

It should be understood that while hashing is described herein as one method of comparing and quantifying differences between device identifier information stored between the user registry and the remote system, other methodologies are also included in this disclosure. For example, string matching, vectorizing, and/or data formatting techniques may be utilized. Generally, the techniques may include functionality that compares the device identifier information from the user registry and from the remote system to identify what data differs. The results of this analysis may then be utilized by the device-information analyzer to quantify the detected anomaly.

Then, a device-information analyzer may receive resulting data from the hashing component and may be configured to analyze the hash values to generate a difference value that indicates the difference(s) between the hash values. By way of example, when the device identifier information stored by the user registry and by the remote system corresponds with each other, the hash values may be the same and the device-information analyzer may generate data indicating that no difference is present. In examples, this data may be represented as a score, which may be associated with a scale. To illustrate, the scale may be from 0 to 100, with 0 indicating no difference between the device identifier information stored by the user registry and the remote system, and 100 indicating complete difference between the information stored by the user registry and the remote system. When a slight variation is determined, such as when the user registry indicates Devices A, B, and C are associated with the user account data but the remote system indicates Devices, A, B, C, and D are associated with the user account data, the device-information analyzer may analyze the hash values and produce a resulting score of 10, by way of example. In the example where the user registry indicates Devices A, B, and C are associated with the user account data, but the remote system indicates Devices A, B, and D are associated with the user account data, the device-information analyzer may analyze the hash values and produce a resulting score of 20, by way of example. And when the user registry indicates Devices A, B, and C are associated with the user account data, but the remote system indicates Devices D, E, and F are associated with the user account data, the device-information analyzer may analyze the hash values and produce a resulting score of 100, by way of example.

At block 904, the process 900 may include associating the first data with fourth data corresponding to historical difference values associated with the remote system over a period of time. For example, an identifier of the remote system associated with the analysis may be stored in association with the difference value data. The difference values associated with the remote system may be stored over time such that changes in the difference values per query and/or over a period of time may be analyzed as described herein.

At block 906, the process 900 may include determining, from the first data and the fourth data, a trend in difference values associated with the remote system, the trend indicating an increase in anomalies detected as between the second data and the third data during the period of time. For example, actions may be taken based at least in part on the detected anomalies from one analysis of received device information from the remote system and the stored device information in the user registry. However, in other examples, actions may be taken based at least in part on an aggregation of anomalies associated with the remote system over a period of time. For example, an aggregation component may be configured to retrieve difference values from the data store for a given remote system and to aggregate the difference values, such as over a given period of time, to determine whether a corrective action should be taken. For example, if aggregation of the difference values over a period of time indicates less than a threshold number of detected anomalies and/or less than a threshold severity of detected anomalies, then the system may determine to refrain from taking a corrective action. However, when a rise in anomalies is detected, particularly when the rise in anomalies results in difference values satisfying a given threshold difference value, the aggregation component may detect these results and an action component, as described more fully below; may be configured to take a corrective action.

In still other examples, the aggregation component may be configured to detect not just a rise in difference values, but also baselines for anomalies associated with the remote system in question. For example, a given remote system may typically be associated with difference values between 0 and 5 on a scale of 0 to 100. The aggregation component may be configured to utilizing this information to establish a baseline for the remote system that is between, for example, 0 and 5. Additionally, certain remote systems may experience a rise in detected anomalies and/or anomaly severities but then the difference values may remain relatively constant. For example, the remote system may have a baseline between 0 and 5, then experience a rise from 5 to 15, and then experience difference values between 15 and 20. The aggregation component may be configured to detect these changes in difference values over time and establish a new baseline of between 15 and 20. The aggregation component may establish the new baseline when, for example, the remote system sends data indicating that the increase in difference values is attributable to a false-positive, which may be caused by a delay in reporting new devices, removed devices, and/or a change in the way that device information is stored. In these examples, while the remote system's device information may differ from the device information stored in the user registry, those differences do not correspond to improperly associating devices with user accounts. As such, the new baseline may be established and utilized for determining whether to take corrective actions based on subsequent detected anomalies.

The aggregation component may also be utilized to confirm that detected anomalies decrease after a corrective action is taken by the system and/or the remote system. For example, when the difference values satisfy a threshold difference value, such as for a given period of time, a corrective action may be taken as outlined elsewhere herein. Thereafter, the aggregation component may monitor difference values associated with the remote system and determine whether the difference values start to decrease, such as within a given amount of time. If the difference values decrease, such as below the threshold difference value, then no additional corrective action may be taken and/or a notification may be sent to the remote system indicating that the issue has been mitigated. However, in instances where the difference values do not start to decrease and/or do not decrease below the threshold difference value, the system may take additional corrective actions to mitigate the device-to-account anomalies.

At block 908, the process 900 may include, in response to the trend, performing an action to mitigate the anomaly. For example, an action component of the system may be configured to utilize the difference values and/or historical difference values as stored in the data store to determine whether an action should be taken, such as an action to mitigate the anomalies detected as between device identifier information stored by the user registry and by the remote system. For example, the action component may determine that the historical difference values indicate the remote system stores device identifier information accurately, but that, for a given user account, anomalies have been detected. In these examples, the action component may select an action such as notifying the remote system that the anomaly has been detected with respect to the user account in question. In other examples, the action component may determine that the detected anomalies correspond to a given event, such as when a user adds a new device to the user account. In these examples, the anomaly may indicate a delay in association of the new device with the user account data, either by the remote system or by the user registry. In these examples, the action may include refraining from sending any notification and/or taking other types of mitigating action. Instead, the action may include waiting a period of time before querying the remote system for updated device identifier information. In still other examples, the action component may determine that the historical difference values satisfy one or more thresholds for taking certain actions. For example, the thresholds may include a certain number of detected anomalies, a certain number of detected anomalies having a difference value above a given threshold value, a certain rate of detected anomalies, etc. In these examples, the detected anomalies may indicate a more systematic problem with how the remote system stores device identifier information and/or an error in communicating device identifier information as between the system and the remote system. In these examples, the action component may select an action to mitigate the anomalies, such as instructing the remote system to fix the problem, temporarily or permanently stopping use of the remote system by users, notifying users of the problem, etc.

Additionally, or alternatively, the process 900 may include determining, from the historical difference values, a threshold difference value to associate with the remote system, the threshold difference value representing detection of more of the anomalies than detected in association with the historical difference values. The process 900 may also include determining that the difference value satisfies the threshold difference value. The process 900 may also include determining that one or more of the historical difference values satisfy the threshold difference value. In these examples, the trend may be determined from the difference value and the one or more of the historical difference values satisfying the threshold difference value.

Additionally, or alternatively, the process 900 may include determining that the third data includes a type of device identifier, the type being one of multiple types of device identifiers stored in a database associated with the user account data. The process 900 may also include selecting the second data from the database from the first data being associated with the type of device identifier.

Additionally, or alternatively, the process 900 may include generating fifth data representing detected anomalies after performing the action and determining that the fifth data indicates a decrease in the detected anomalies. The process 900 may also include determining to refrain from performing an additional action to mitigate the anomaly in response to the fifth data indicating the decrease in the detected anomalies.

Additionally, or alternatively, the process 900 may include identifying fourth data indicating historical difference values associated with the remote system. The process 900 may also include determining, utilizing the third data and the fourth data, that device identifier information from the remote system included anomalies at least a threshold number of times during a period of time. The process 900 may also include selecting the action from multiple actions in response to the device identifier information from the remote system including the anomalies the at least the threshold number of times during the period of time.

Additionally, or alternatively, the process 900 may include the first hash value representing first media access control addresses, first serial numbers, first device endpoint identifiers, first naming indicators, and first user identifiers. The process 900 may also include the second hash value representing second media access control addresses, second serial numbers, second device endpoint identifiers, second naming indicators, and second user identifiers. The process 900 may also include the difference value indicating at least one of: the remote system associating the device with the user account data while the database indicates the device is unassociated with the user account data; or the database associating the device with the user account data while the remote system indicates the device is unassociated with the user account data.

Additionally, or alternatively, the process 900 may include inputting, into a model configured to predict a cause of anomalies associated with the first device identifier information and the second device identifier information, the first data, the second data, and the third data. The process 900 may also include generating, utilizing the model, fourth data indicating a determined cause of the anomaly. The process 900 may also include selecting the action from multiple actions, the action designated as correcting the cause of the anomaly.

FIG. 10 illustrates a flow diagram of another example process for device-to-account anomaly detection. The order in which the operations or steps are described is not intended to be construed as a limitation, and any number of the described operations may be combined in any order and/or in parallel to implement process 1000.

At block 1002, the process 1000 may include generating first data representing a difference value between second data and third data, wherein: the second data represents first device identifier information stored for first devices associated with user account data; and the third data represents second device identifier information that a system associated with the first devices has reported as being associated with the user account data. For example, device identifier information may be stored in a user registry of a system associated with voice interface devices. A query component may query the remote systems on a periodic, scheduled, or directed basis. By way of example, the query component may query the remote systems once every 24 hours, and/or at a certain time of day and/or day of the week. The query component may also query the remote systems based at least in part on user input. For example, when a user adds a new device to a user account, this occurrence may trigger the query component to request device identifier information from the remote system associated with the new device. It should be understood that one or more other trigger events for querying the remote system are contemplated and included in this disclosure.

The system may receive the device identifier information from the remote system that was queried. The device identifier information may include any information that identifies or is otherwise associated with devices that the remote system has associated with the user account at issue. For example, the device identifier information may include MAC addresses, serial numbers, endpoint identifiers, naming indicators, and/or user identifiers as stored by the remote system. The MAC addresses may indicate the network interface controller designated for use by the device(s). The serial numbers may include the identifier of the device(s) as provided by the manufacturer of the device(s). The endpoint identifiers may indicate a unique identifier of the device(s) as provided by the remote system. The naming indicators may indicate the name of the device(s) as supplied by the remote system and/or by a user of the device, such as "bedroom light," etc. The user identifiers may indicate the user(s) associated with the device(s) and/or the user accounts associated with the device(s). The types of device identifier information presented above are provided by way of example and not as a limitation. It should be understood that additional or different device identifier types are also included in this disclosure.

Once the device identifier information is acquired from the remote system, a hashing component may be configured to generate hash values representing the device identifier information. For example, locality-sensitive hashing may be utilized to generate a hash value for the device identifier information. In these examples, input data for the hashing component may include the device identifier information received from the remote system. The hashing component may then utilize the device identifier information to generate a hash value that represents the device identifier information. The hashing component may also utilize device identifier information from the user registry to generate a hash value that represents that device identifier information. Here, utilizing locality-sensitive hashing, when the input to the hashing component is consistent, the resulting hash value will be consistent. In other words, if the device identifier information from the remote system matches the device identifier information stored in the user registry, the hash values generated by the hashing component will be the same. However, when an anomaly is present as between the device identifier information stored by the remote system and by the user registry, the hash values will differ. However, unlike other hash functions where hash collisions are minimized such that even small variations in input result in complete or nearly-complete differences in hash values, locality-sensitive hashing allows for hash collisions to be maximized. As such, when variations in input result, the quantity of differences can be determined from the resulting hash values. For example, when the device identifier information from the user registry indicates that Devices A, B, and C are associated with given user account data, but the device identifier information from the remote system indicates Devices A, B, C, and D are associated with the user account data, the resulting hash values will mostly correspond to each other but a slight variation representing the additional Device D will be present. By way of additional example, user registry information associating Devices A, B, and C with the user account data, and remote system information associating Devices A, B, and D with the user account data, will result in hash values with some similarities and some differences. In this example, the difference in hash values will be greater than the differences from the prior example because of both the addition of Device D and the missing Device C. By way of further example, user registry information associating Devices A, B, and C with the user account data, and remote system information associating Devices D, E, and F with the user account data, will result in completely different hash values.

It should be understood that while hashing is described herein as one method of comparing and quantifying differences between device identifier information stored between the user registry and the remote system, other methodologies are also included in this disclosure. For example, string matching, vectorizing, and/or data formatting techniques may be utilized. Generally, the techniques may include functionality that compares the device identifier information from the user registry and from the remote system to identify what data differs. The results of this analysis may then be utilized by the device-information analyzer to quantify the detected anomaly.

Then, a device-information analyzer may receive resulting data from the hashing component and may be configured to analyze the hash values to generate a difference value that indicates the difference(s) between the hash values. By way of example, when the device identifier information stored by the user registry and by the remote system corresponds with each other, the hash values may be the same and the device-information analyzer may generate data indicating that no difference is present. In examples, this data may be represented as a score, which may be associated with a scale. To illustrate, the scale may be from 0 to 100, with 0 indicating no difference between the device identifier information stored by the user registry and the remote system, and 100 indicating complete difference between the information stored by the user registry and the remote system. When a slight variation is determined, such as when the user registry indicates Devices A, B, and C are associated with the user account data but the remote system indicates Devices, A, B, C, and D are associated with the user account data, the device-information analyzer may analyze the hash values and produce a resulting score of 10, by way of example. In the example where the user registry indicates Devices A, B, and C are associated with the user account data, but the remote system indicates Devices A, B, and D are associated with the user account data, the device-information analyzer may analyze the hash values and produce a resulting score of 20, by way of example. And when the user registry indicates Devices A, B, and C are associated with the user account data, but the remote system indicates Devices D, E, and F are associated with the user account data, the device-information analyzer may analyze the hash values and produce a resulting score of 100, by way of example.

At block 1004, the process 1000 may include determining fourth data corresponding to historical difference values associated with the system over a period of time. For example, an identifier of the remote system associated with the analysis may be stored in association with the difference value data. The difference values associated with the remote system may be stored over time such that changes in the difference values per query and/or over a period of time may be analyzed as described herein.

At block 1006, the process 1000 may include determining, based at least in part on the first data and the fourth data, a trend in difference values associated with the system, the trend indicating an increase in anomalies detected as between the second data and the third data. For example, actions may be taken based at least in part on the detected anomalies from one analysis of received device information from the remote system and the stored device information in the user registry. However, in other examples, actions may be taken based at least in part on an aggregation of anomalies associated with the remote system over a period of time. For example, an aggregation component may be configured to retrieve difference values from the data store for a given remote system and to aggregate the difference values, such as over a given period of time, to determine whether a corrective action should be taken. For example, if aggregation of the difference values over a period of time indicates less than a threshold number of detected anomalies and/or less than a threshold severity of detected anomalies, then the system may determine to refrain from taking a corrective action. However, when a rise in anomalies is detected, particularly when the rise in anomalies results in difference values satisfying a given threshold difference value, the aggregation component may detect these results and an action component, as described more fully below; may be configured to take a corrective action.

In still other examples, the aggregation component may be configured to detect not just a rise in difference values, but also baselines for anomalies associated with the remote system in question. For example, a given remote system may typically be associated with difference values between 0 and 5 on a scale of 0 to 100. The aggregation component may be configured to utilizing this information to establish a baseline for the remote system that is between, for example, 0 and 5. Additionally, certain remote systems may experience a rise in detected anomalies and/or anomaly severities but then the difference values may remain relatively constant. For example, the remote system may have a baseline between 0 and 5, then experience a rise from 5 to 15, and then experience difference values between 15 and 20. The aggregation component may be configured to detect these changes in difference values over time and establish a new baseline of between 15 and 20. The aggregation component may establish the new baseline when, for example, the remote system sends data indicating that the increase in difference values is attributable to a false-positive, which may be caused by a delay in reporting new devices, removed devices, and/or a change in the way that device information is stored. In these examples, while the remote system's device information may differ from the device information stored in the user registry, those differences do not correspond to improperly associating devices with user accounts. As such, the new baseline may be established and utilized for determining whether to take corrective actions based on subsequent detected anomalies.

The aggregation component may also be utilized to confirm that detected anomalies decrease after a corrective action is taken by the system and/or the remote system. For example, when the difference values satisfy a threshold difference value, such as for a given period of time, a corrective action may be taken as outlined elsewhere herein. Thereafter, the aggregation component may monitor difference values associated with the remote system and determine whether the difference values start to decrease, such as within a given amount of time. If the difference values decrease, such as below the threshold difference value, then no additional corrective action may be taken and/or a notification may be sent to the remote system indicating that the issue has been mitigated. However, in instances where the difference values do not start to decrease and/or do not decrease below the threshold difference value, the system may take additional corrective actions to mitigate the device-to-account anomalies.

At block 1008, the process 1000 may include, based at least in part on the trend, determining to perform an action associated with the anomalies. For example, an action component of the system may be configured to utilize the difference values and/or historical difference values as stored in the data store to determine whether an action should be taken, such as an action to mitigate the anomalies detected as between device identifier information stored by the user registry and by the remote system. For example, the action component may determine that the historical difference values indicate the remote system stores device identifier information accurately, but that, for a given user account, anomalies have been detected. In these examples, the action component may select an action such as notifying the remote system that the anomaly has been detected with respect to the user account in question. In other examples, the action component may determine that the detected anomalies correspond to a given event, such as when a user adds a new device to the user account. In these examples, the anomaly may indicate a delay in association of the new device with the user account data, either by the remote system or by the user registry. In these examples, the action may include refraining from sending any notification and/or taking other types of mitigating action. Instead, the action may include waiting a period of time before querying the remote system for updated device identifier information. In still other examples, the action component may determine that the historical difference values satisfy one or more thresholds for taking certain actions. For example, the thresholds may include a certain number of detected anomalies, a certain number of detected anomalies having a difference value above a given threshold value, a certain rate of detected anomalies, etc. In these examples, the detected anomalies may indicate a more systematic problem with how the remote system stores device identifier information and/or an error in communicating device identifier information as between the system and the remote system. In these examples, the action component may select an action to mitigate the anomalies, such as instructing the remote system to fix the problem, temporarily or permanently stopping use of the remote system by users, notifying users of the problem, etc.

Additionally, or alternatively, the process 1000 may include determining, based at least in part on the historical difference values, a threshold difference value to associate with the system. The process 1000 may also include determining that the difference value satisfies the threshold difference value. The process 1000 may also include determining that one or more of the historical difference values satisfy the threshold difference value. In these examples, the trend may be determined based at least in part on the difference value and the one or more of the historical difference values satisfying the threshold difference value.

Additionally, or alternatively, the process 1000 may include determining that the third data includes a type of device identifier, the type being one of multiple types of device identifiers stored in a database associated with the user account data. The process 1000 may also include selecting the second data from the database based at least in part on the first data being associated with the type of device identifier.

Additionally, or alternatively, the process 1000 may include generating fifth data representing detected anomalies after performing the action and determining that the fifth data indicates a decrease in the detected anomalies. The process 1000 may also include determining to refrain from performing an additional action to mitigate the anomaly based at least in part on the fifth data indicating the decrease in the detected anomalies.

Additionally, or alternatively, the process 1000 may include identifying data indicating historical dissimilarity values associated with the remote system. The process 1000 may also include determining, based at least in part on the third data and the fourth data, that device identifier information from the remote system includes anomalies at least a threshold number of times during a period of time. The process 1000 may also include selecting the action from multiple actions based at least in part on the device identifier information including the anomalies the at least the threshold number of times during the period of time.

Additionally, or alternatively, the process 1000 may include the first device identifier information including at least one of first media access control addresses, first serial numbers, first device endpoint identifiers, first naming indicators, or first user identifiers. The process 1000 may also include the second device identifier information including at least one of second media access control addresses, second serial numbers, second device endpoint identifiers, second naming indicators, or second user identifiers. The process 1000 may also include the first data indicating at least one of: the remote system associating the device with the user account data while the device is unassociated with the user account data; or the device being associated with the user account data while the remote system indicates the device is unassociated with the user account data.

Additionally, or alternatively, the process 1000 may include generating, utilizing a model configured to predict a cause of anomalies between the first device identifier information and the second device identifier information, fourth data indicating the cause of the anomaly. The process 1000 may also include selecting the action from multiple actions based at least in part on the fourth data.

Additionally, or alternatively, the process 1000 may include identifying data indicating historical dissimilarity values associated with the remote system. The process 1000 may also include determining that the historical dissimilarity values satisfy a threshold dissimilarity value. The process 1000 may also include querying the remote system a second number of times instead of the first number of times based at least in part on the historical dissimilarity values satisfying the threshold dissimilarity value, the second number of times being fewer than the first number of times.

Additionally, or alternatively, the process 1000 may include determining that the second data includes a type of device identifier, the type being one of multiple types of device identifiers stored in a database associated with the user account data. The process 1000 may also include selecting the first data from the database based at least in part on the first data being associated with the type of device identifier.

Additionally, or alternatively, the process 1000 may include generating a first hash value utilizing the first data and generating a second hash value utilizing the second data. In these examples, generating the third data may be based at least in part on the first hash value and the second hash value.

Additionally, or alternatively, the process 1000 may include receiving, from a user device, request data to associate a newly-added device with the user account data. The process 1000 may also include querying the remote system for the second data in response to receiving the request data. The process 1000 may also include identifying a first portion of the second data associated with the newly-added device. In these examples, generating the third data may be based at least in part on the first data and a second portion of the second data, the second portion differing from the first portion.

Additionally, or alternatively, the process 1000 may include receiving fifth data from the system indicating a cause of the trend and determining that the cause of the trend corresponds to at least one of multiple causes predetermined to be a false positive anomaly. The process 1000 may also include determining a threshold difference value to associate with the system for performing subsequent mitigating actions, the threshold difference value determined utilizing the first data.

Figure 11:
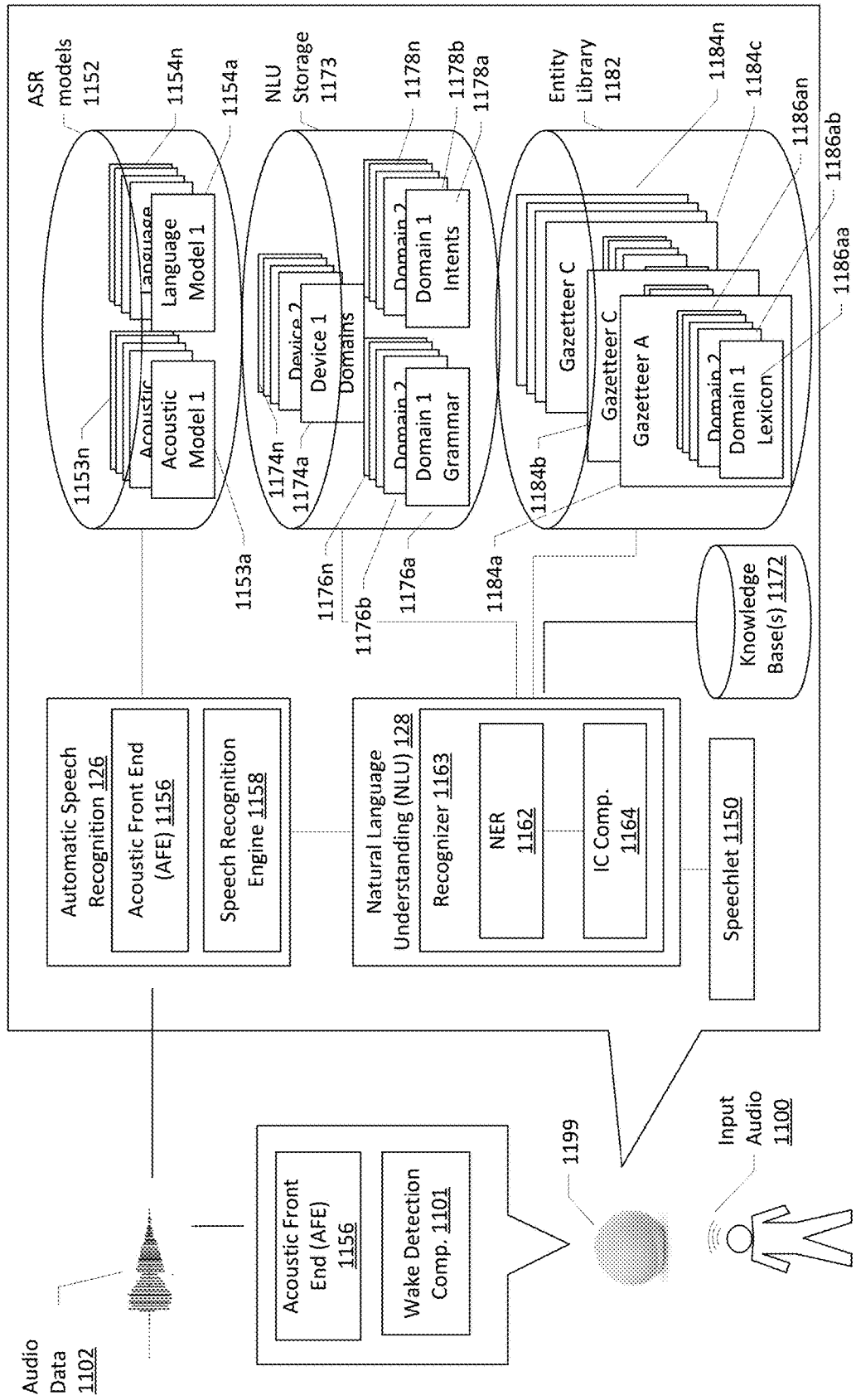
FIG. 11 illustrates a conceptual diagram of components of a speech-processing system for processing audio data provided by one or more devices.

FIG. 11 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 11 may occur directly or across a network 106. An audio capture component, such as a microphone of the device 1199, or another device, captures audio 1100 corresponding to a spoken utterance. The device, using a wake word engine 1101, then processes audio data corresponding to the audio 1100 to determine if a keyword (such as a wakeword) is detected in the audio data. Following detection of a wakeword, the device processes audio data 1102 corresponding to the utterance utilizing an ASR component 126. The audio data 1102 may be output from an optional acoustic front end (AFE) 1156 located on the device prior to transmission. In other instances, the audio data 1102 may be in a different form for processing by a remote AFE 1156, such as the AFE 1156 located with the ASR component 126.

The wake word engine 1101 works in conjunction with other components of the user device, for example a microphone to detect keywords in audio 1100. For example, the device may convert audio 1100 into audio data, and process the audio data with the wake word engine 1101 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input: the energy levels of the audio input in one or more spectral bands: the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1101 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 1101 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device may "wake." The audio data 1102 may include data corresponding to the wakeword. Further, a local device may "wake" upon detection of speech/spoken audio above a threshold, as described herein. An ASR component 126 may convert the audio data 1102 into text. The ASR transcribes audio data into text data representing the words of the speech contained in the audio data 1102. The text data may then be used by other components for various purposes, such as executing system commands, inputting data, etc. A spoken utterance in the audio data is input to a processor configured to perform ASR which then interprets the utterance based on the similarity between the utterance and pre-established language models 1154 stored in an ASR model knowledge base (ASR Models Storage 1152). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1153 stored in an ASR Models Storage 1152), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 126 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1156 and a speech recognition engine 1158. The acoustic front end (AFE) 1156 transforms the audio data from the microphone into data for processing by the speech recognition engine 1158. The speech recognition engine 1158 compares the speech recognition data with acoustic models 1153, language models 1154, and other data models and information for recognizing the speech conveyed in the audio data. The AFE 1156 may reduce noise in the audio data and divide the digitized audio data into frames representing time intervals for which the AFE 1156 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1158 may process the output from the AFE 1156 with reference to information stored in speech/model storage (1152). Alternatively, post front-end processed data (such as feature vectors) may be received by the device executing ASR processing from another source besides the internal AFE. For example, the user device may process audio data into feature vectors (for example using an on-device AFE 1156).

The speech recognition engine 1158 attempts to match received feature vectors to language phonemes and words as known in the stored acoustic models 1153 and language models 1154. The speech recognition engine 1158 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, discovery Device A?" The wake detection component may identify the wake word, otherwise described as a trigger expression, "Alexa," in the user utterance and may "wake" based on identifying the wake word. The speech recognition engine 1158 may identify, determine, and/or generate text data corresponding to the user utterance, here "discovery Device A."

The speech recognition engine 1158 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1158 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 128 may include various components, including potentially dedicated processor(s), memory, storage, etc. As shown in FIG. 11, an NLU component 128 may include a recognizer 1163 that includes a named entity recognition (NER) component 1162 which is used to identify portions of query text that correspond to a named entity that may be recognizable by the system. A downstream process called named entity resolution links a text portion to a specific entity known to the system. To perform named entity resolution, the system may utilize gazetteer information (1184a-1184n) stored in entity library storage 1182. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 126 based on the utterance input audio 1100) and attempts to make a semantic interpretation of the text. That is, the NLU process determines the meaning behind the text based on the individual words and then implements that meaning. NLU processing 158 interprets a text string to derive an intent or a desired action from the user as well as the pertinent pieces of information in the text that allow a device (e.g., device 1199) to complete that action. For example, if a spoken utterance is processed using ASR 126 and outputs the text "discover Device A" the NLU process may determine that the user intended to have the system detect Device A, which may have been newly-added to the user's network of devices.

The NLU 128 may process several textual inputs related to the same utterance. For example, if the ASR 126 outputs N text segments (as part of an N-best list), the NLU may process all N outputs to obtain NLU results.

As will be discussed further below, the NLU process may be configured to parse and tag to annotate text as part of NLU processing. For example, for the text "discovery Device A," "discover" may be tagged as a command (to identify a new device) and "Device A" may be tagged as the naming identifier of the device to be discovered.

To correctly perform NLU processing of speech input, an NLU process 128 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1162 receives a query in the form of ASR results and attempts to identify relevant grammars and lexical information that may be used to construe meaning. To do so, the NLU component 128 may begin by identifying potential domains that may relate to the received query. The NLU storage 1173 includes a database of devices (1174a-1174n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 1163, language model and/or grammar database (1176a-1176n), a particular set of intents/actions (1178a-1178n), and a particular personalized lexicon (1186). Each gazetteer (1184a-1184n) may include domain-indexed lexical information associated with a particular user and/or device. For example, the Gazetteer A (1184a) includes domain-index lexical information 1186aa to 1186an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1164 parses the query to determine an intent or intents for each identified domain, where the intent corresponds to the action to be performed that is responsive to the query. Each domain is associated with a database (1178a-1178n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1164 identifies potential intents for each identified domain by comparing words in the query to the words and phrases in the intents database 1178. In some instances, the determination of an intent by the IC component 1164 is performed using a set of rules or templates that are processed against the incoming text to identify a matching intent.

In order to generate a particular interpreted response, the NER 1162 applies the grammar models and lexical information associated with the respective domain to actually recognize a mention of one or more entities in the text of the query. In this manner, the NER 1162 identifies "slots" or values (i.e., particular words in query text) that may be needed for later command processing. Depending on the complexity of the NER 1162, it may also label each slot with a type of varying levels of specificity (such as noun, place, device name, device location, city, artist name, song name, amount of time, timer number, or the like). Each grammar model 1176 includes the names of entities (i.e., nouns) commonly found in speech about the particular domain (i.e., generic terms), whereas the lexical information 1186 from the gazetteer 1184 is personalized to the user(s) and/or the device. For instance, a grammar model associated with the shopping domain may include a database of words commonly used when people discuss shopping.

The intents identified by the IC component 1164 are linked to domain-specific grammar frameworks (included in 1176) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1176) framework or frameworks may correspond to sentence structures such as "purchase item called 'Item A' from Marketplace A."

For example, the NER component 1162 may parse the query to identify words as subject, object, verb, preposition, etc., based on grammar rules and/or models, prior to recognizing named entities. The identified verb may be used by the IC component 1164 to identify intent, which is then used by the NER component 1162 to identify frameworks. A framework for the intent of "play a song." meanwhile, may specify a list of slots/fields applicable to play the identified "song" and any object modifier (e.g., specifying a music collection from which the song should be accessed) or the like. The NER component 1162 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1162 may search the database of generic words associated with the domain (in the knowledge base 1172). So, for instance, if the query was "identify this song," after failing to determine which song is currently being output, the NER component 1162 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 1150. The destination speechlet 1150 may be determined based on the NLU output. For example, if the NLU output includes a command to send a message, the destination speechlet 1150 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 1150 may provide some or all of this information to a text-to-speech (TTS) engine. The TTS engine may then generate an actual audio file for outputting the audio data determined by the application (e.g., "okay," or "Device A discovered").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 128 during runtime operations where NLU operations are performed on text (such as text output from an ASR component 126). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1163. Each recognizer may include various NLU components such as an NER component 1162, IC component 1164 and other components such as an entity resolver, or other components.

For example, a messaging domain recognizer 1163-A (Domain A) may have an NER component 1162-A that identifies what slots (i.e., portions of input text) may correspond to particular words relevant to that domain. The words may correspond to entities such as (for the messaging domain) a recipient. An NER component 1162 may use a machine learning model, such as a domain specific conditional random field (CRF) to both identify the portions corresponding to an entity as well as identify what type of entity corresponds to the text portion. The messaging domain recognizer 1163-A may also have its own intent classification (IC) component 1164-A that determines the intent of the text assuming that the text is within the proscribed domain. An IC component may use a model, such as a domain specific maximum entropy classifier to identify the intent of the text, where the intent is the action the user desires the system to perform. For this purpose, device 1199 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

Figure 12:
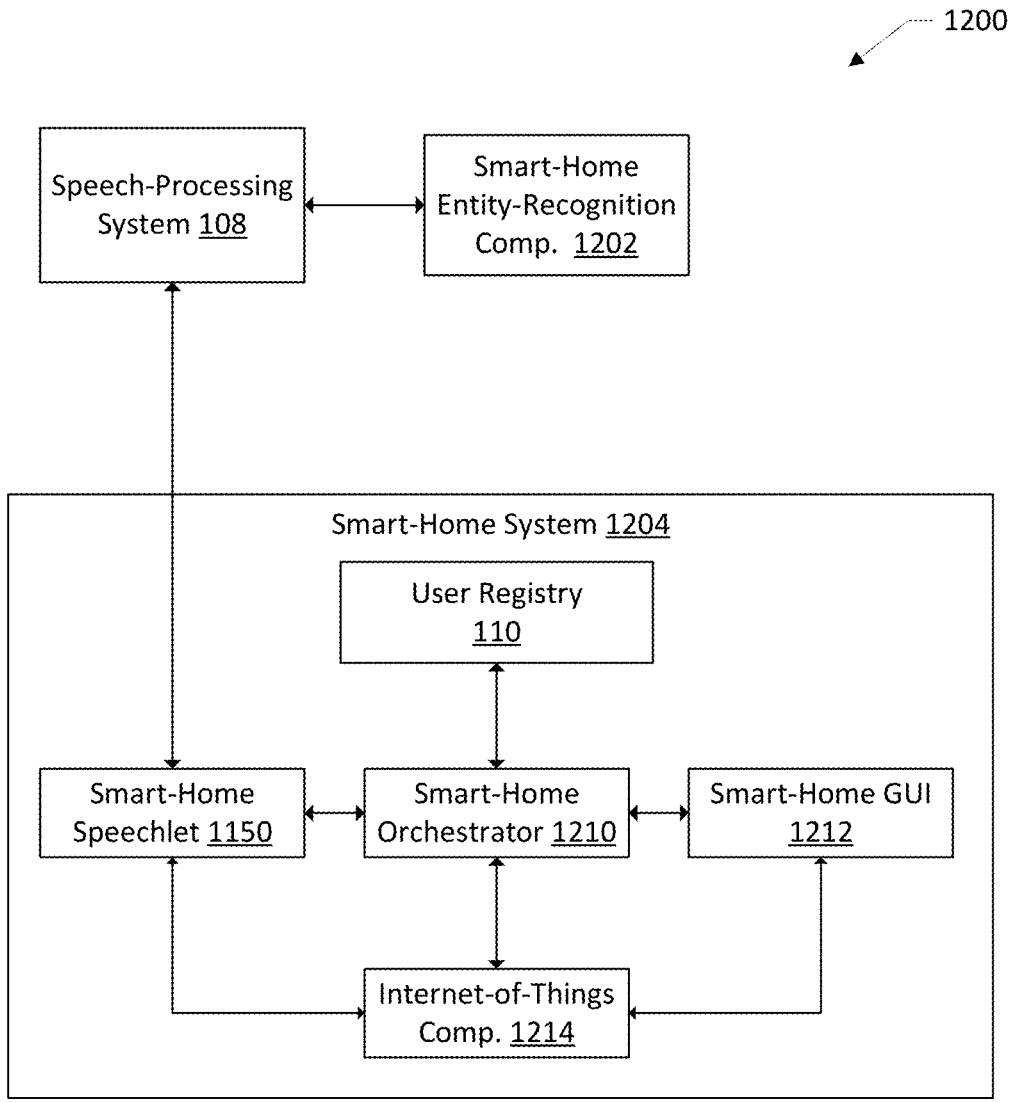
FIG. 12 illustrates a conceptual diagram of example components of a smart-home system that may be utilized for device-to-account anomaly detection.

FIG. 12 illustrates a conceptual diagram of example components of a smart-home system that may be utilized for device-to-account anomaly detection. The smart-home system 1204 may include components such as a smart-home speechlet 1150, for example. The smart-home system 1204 may also be configured to send data to and receive data from other components of a system and/or one or more other systems. For example, the other components may include a speech-processing system 108. The smart-home system 1204 may also include components such as a smart-home orchestrator 1210, a smart-home graphical user interface (GUI) 1212, and/or an internet-of-things component 1214. Each of these components will be described in detail below.

As described herein, a user may interact with a smart device using tactile input to the smart device, voice input to a voice-controlled device, and/or input to an application residing on and/or accessible to a personal device. When a user interacts with a smart device using voice input to a voice-controlled device, audio data representing user utterances may be received at the speech-processing system 108. The speech-processing system 108 may analyze the audio data and/or corresponding text data generated, by way of example, using an ASR component, to determine that the user utterance represents an intent to control a smart device. To determine the intent associated with the user utterance, the speech-processing system 108 may utilize a smart-home entity-recognition component 1202, which may be utilized to inform one or more intents available to the speech-processing system 108 and/or to inform one or more values associated with the intents. For example, the user utterance of "turn off bedroom lights" may be analyzed by the speech-processing system 108. The smart-home entity-recognition component 1202 may train or otherwise provide data to the speech-processing system 108 indicating intents associated with operation of smart devices, such as "turn on," "turn off," "activate," "deactivate," "dim," "brighten," "lock," "unlock," etc. The smart-home entity-recognition component 1202 may additionally, or alternatively, provide data indicating identifiers and/or payloads associated with such intents, such as "light," "lights," "lock," "outlet," "switch," etc. It should be understood that while the smart-home entity-recognition component 1202 is depicted in FIG. 12 as being a component separate from the smart-home system 1204, the smart-home entity-recognition component 1202 may be a component of the smart-home system 1204.

The speech-processing system 108 may be configured to determine that the intent corresponds to an operation configured to be performed by the smart-home system 1204, and based at least in part on such a determination, the speech-processing system 1204 may provide the intent data and/or other data associated with the request to the smart-home speechlet 1150 of the smart-home system 1204. The smart-home orchestrator 1210 may be configured to receive data indicating that the smart-home speechlet 1150 has been invoked to determine a directive to be performed with respect to a smart device and may query one or more other components of the smart-home system 1204 to effectuate the request. For example, the smart-home orchestrator 1210 may query the internet-of-things component 1214 to identify naming indicators associated with smart devices for a particular user account. The internet-of-things component 1214 may query data store(s) and/or the user registry 110 and/or the user account for such naming indicators.

In other examples, such as when the smart-home speechlet 1150 receives a request to discover a smart device, such as from a smart-device system, the smart-home orchestrator 1210 may query one or more components of the smart-home system 1204 to determine associations between smart device identifiers and user account identifiers as described herein. Additionally, or alternatively, as mentioned above, the smart devices may be operated based at least in part on input data received from an application residing on and/or accessible to a personal device, such as a mobile phone and/or computer. The smart-home GUI 1212 may be utilized to receive the input data and/or to display recommendations and/or requests to a user. For example, the smart-home GUI 1212 may be utilized to display a request to confirm that a selected smart device is the desired device to be acted upon.

Figure 13:
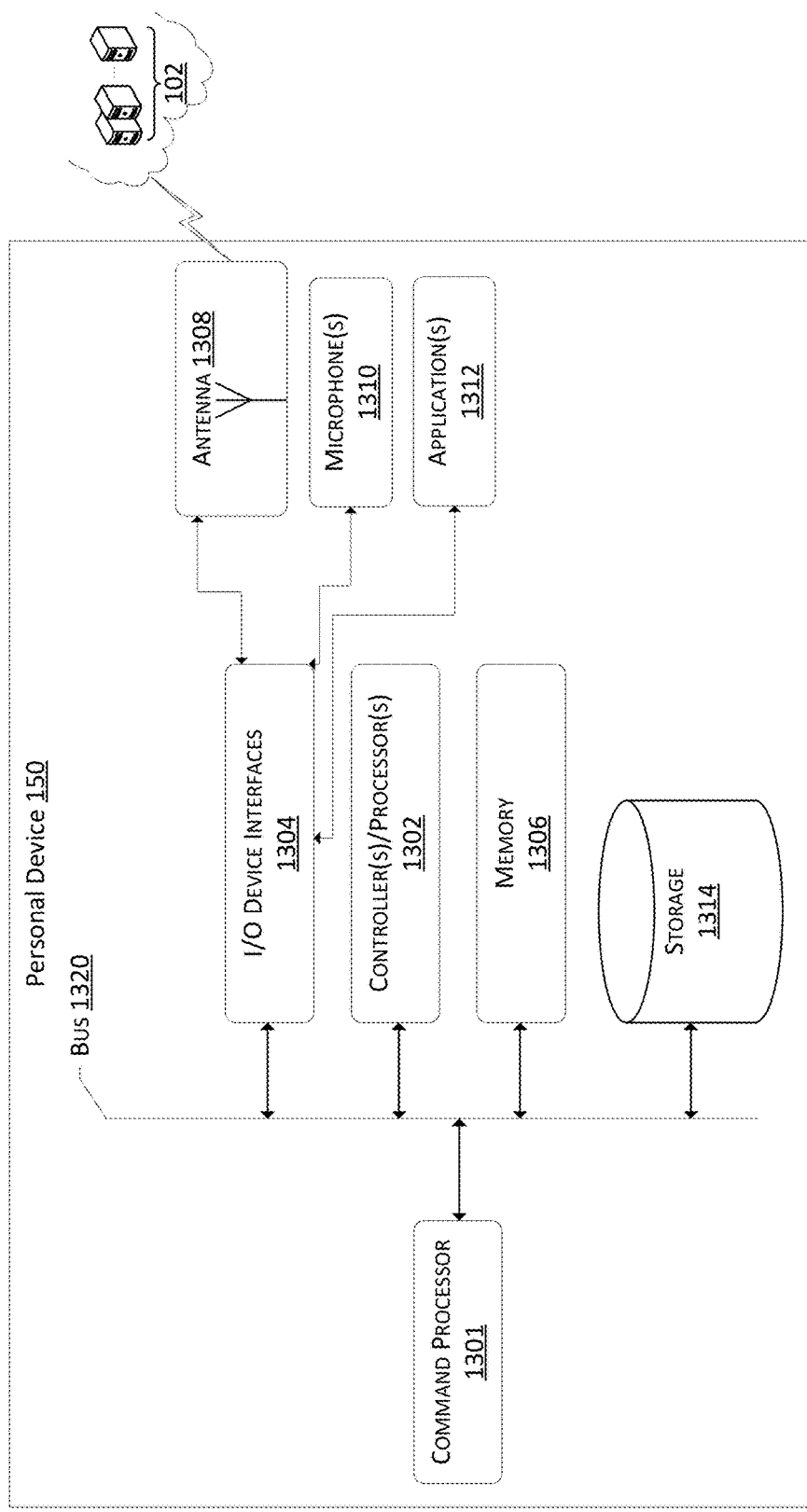
FIG. 13 illustrates a conceptual diagram of example components of a personal device that may be utilized in association with device-to-account anomaly detection.

FIG. 13 illustrates a conceptual diagram of example components of a personal device 150 that may be utilized in association with device-to-account anomaly detection. For example, the device 150 may include a device that includes input means to receive voice input. The device 150 may be implemented as a standalone device that is relatively simple in terms of functional capabilities with limited input/output components, memory, and processing capabilities. For instance, the device 150 may not have a keyboard, keypad, touchscreen, or other form of mechanical input. In some instances, the device 150 may include a microphone 1310, a power source, and functionality for sending generated audio data via one or more antennas 1308 to another device and/or system. In other examples, the device 150 may have additional input configurations, such as a touchscreen for receiving touch input.

The device 150 of FIG. 13 may include one or more controllers/processors 1302, that may include a central processing unit (CPU) for processing data and computer-readable instructions, and memory 1306 for storing data and instructions of the device 150. In examples, the skills and/or applications 1312 described herein may be stored in association with the memory 1306, which may be queried for content and/or responses as described herein. The device 150 may also be connected to removable or external non-volatile memory and/or storage, such as a removable memory card, memory key drive, networked storage, etc., through input/output device interfaces 1304.

Computer instructions for operating the device 150 and its various components may be executed by the device's controller(s)/processor(s) 1302, using the memory 1306 as "working" storage at runtime. A device's computer instructions may be stored in a non-transitory manner in non-volatile memory 1306, storage 1314, or an external device(s). Alternatively, some or all of the executable instructions may be embedded in hardware or firmware on the device 150 in addition to or instead of software.

The device 150 may include input/output device interfaces 1304. A variety of components may be connected through the input/output device interfaces 1304. Additionally, the device 150 may include an address/data bus 1320 for conveying data among components of the respective device. Each component within a device 150 may also be directly connected to other components in addition to, or instead of, being connected to other components across the bus 1320.

The device 150 may also include an audio capture component. The audio capture component may be, for example, a microphone 1310 or array of microphones, a wired headset or a wireless headset, etc. The microphone 1310 may be configured to capture audio. If an array of microphones is included, approximate distance to a sound's point of origin may be determined using acoustic localization based on time and amplitude differences between sounds captured by different microphones of the array. The device 150 (using input/output device interfaces 1304, antenna 1308, etc.) may also be configured to transmit audio data to the remote system 104 and/or to the system 102 for processing. When touch input is received, corresponding input data may be generated and transmitted to the remote system 104 and/or the system 102.

Via the antenna(s) 1308, the input/output device interface 1304 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 150 via wired connection to an external alternating current (AC) outlet, and/or via onboard power sources, such as batteries, solar panels, etc.

The device 150 and/or the remote system 104 may also include a command processor 1301 that is configured to execute commands/functions as described herein. For example, one or more commands may be received by the device 150 from the remote system 104 and/or from another device such as a user device and/or the audio-input device. The command processor 1301 may receive the commands and utilize the components of the device 150 to process those commands. Such commands may cause the device 150 to output sound, such as via speakers.

The device 150 may also include one or more applications 1312. The applications 1312 may be configured to receive user input data to perform operations associated with devices. Those operations may include controlling the devices, associating newly-acquired devices to a user account, removing devices from the user account, requesting discovery of devices, changing information associated with devices such as device names, etc. As described herein, interactions with the applications 1312 may trigger querying of associated remote systems 104 for device information to perform device-to-account anomaly detection.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
   one or more processors; and
   non-transitory computer-readable media storing computer-executable instructions that, when executed by the one or more processors, cause the one or more processors to perform operations comprising:
      generating, at the system, first data representing a difference value between a first hash value generated by the system and a second hash value generated by a remote system that differs from the system, the difference value indicating a dissimilarity between the first hash value and the second hash value, wherein the difference value is generated by comparing the first hash value and the second hash value, and wherein:
         the first hash value represents second data indicating first device identifier information stored at the system for first devices associated with user account data, the first devices associated with the remote system configured to control the first devices; and
         the second hash value represents third data indicating second device identifier information stored at the remote system that the remote system has associated with the user account data;
      associating the first data with fourth data corresponding to historical difference values associated with the remote system over a period of time, wherein the historical difference values indicate historical differences in prior device identifier information stored by the system and prior device identifier information stored by the remote system;
      determining, from the first data and the fourth data, a trend in difference values associated with the remote system, the trend indicating an increase in device identifier information anomalies detected as between the second data stored at the system and the third data stored at the remote system during the period of time; and
      in response to the trend, performing an action to mitigate the anomalies.

2. The system of claim 1, the operations further comprising:
   determining, from the historical difference values, a threshold difference value to associate with the remote system, the threshold difference value indicating detection of more of the anomalies than detected in association with the historical difference values;
   determining that the difference value satisfies the threshold difference value;
   determining that one or more of the historical difference values satisfy the threshold difference value; and
   wherein the trend is determined from the difference value and the one or more of the historical difference values satisfying the threshold difference value.

3. The system of claim 1, the operations further comprising:
   determining that the third data includes a type of device identifier, the type being one of multiple types of device identifiers stored in a database associated with the user account data; and
   selecting the second data from the database in response to the second data being associated with the type of device identifier.

4. The system of claim 1, the operations further comprising:
   generating fifth data representing detected anomalies after performing the action;
   determining that the fifth data indicates a decrease in the detected anomalies; and
   determining to refrain from performing an additional action to mitigate the anomalies in response to the fifth data indicating the decrease in the detected anomalies.

5. A method, comprising:
   generating first data representing a difference value between second data indicating a first encoded value generated by a first system and third data indicating a second encoded value generated by a second system that differs from the first system, wherein the difference value is generated by comparing the first encoded value and the second encoded value, and wherein:
      the second data represents first device identifier information stored by the first system for first devices associated with user account data; and
      the third data represents second device identifier information stored by the second system and that the second system has reported as being associated with the user account data;
   querying a database for fourth data corresponding to historical difference values over a period of time, wherein the historical difference values indicate historical differences in prior device identifier information stored by the first system and prior device identifier information stored by the second system;
   determining, based at least in part on the first data and the fourth data, a trend in difference values associated with the second system, the trend indicating an increase in device identifier information anomalies detected as between the second data as stored by the first system and the third data as stored by the second system; and
   based at least in part on the trend, determining to perform an action associated with the anomalies.

6. The method of claim 5, further comprising:
   determining, based at least in part on the historical difference values, a threshold difference value to associate with the second system;
   determining that the difference value satisfies the threshold difference value;
   determining that one or more of the historical difference values satisfy the threshold difference value; and
   wherein the trend is determined based at least in part on the difference value and the one or more of the historical difference values satisfying the threshold difference value.

7. The method of claim 5, further comprising:
determining that the third data includes a type of device identifier, the type being one of multiple types of device identifiers stored in a database associated with the user account data; and
selecting the second data from the database based at least in part on the first data being associated with the type of device identifier.

8. The method of claim 5, further comprising:
generating fifth data representing detected anomalies after performing the action;
determining that the fifth data indicates a decrease in the detected anomalies; and
determining to refrain from performing an additional action to mitigate the anomalies based at least in part on the fifth data indicating the decrease in the detected anomalies.

9. The method of claim 5, wherein device identifier information is received from the second system at a first rate, and the method further comprises:
determining that the historical difference values satisfy a threshold difference value; and
querying the second system at a second rate instead of the first rate based at least in part on the historical difference values satisfying the threshold difference value, the second rate differing from the first rate.

10. The method of claim 5, further comprising:
receiving fifth data from the second system indicating a cause of the trend;
determining that the cause of the trend corresponds to at least one of multiple causes predetermined to be associated with a false positive anomaly; and
determining a threshold difference value to associate with the second system for performing subsequent mitigating actions, the threshold difference value determined based at least in part on the cause corresponding to the at least one of the multiple causes.

11. The method of claim 5, further comprising:
generating a first hash value utilizing the second data;
generating a second hash value utilizing the third data; and
wherein generating the first data comprises generating the first data based at least in part on the first hash value and the second hash value.

12. The method of claim 5, further comprising:
receiving, from a user device having installed thereon an application associated with the second system, request data to associate a newly-added device with the user account data;
querying the second system for the third data in response to receiving the request data;
identifying a first portion of the third data associated with the newly-added device; and
wherein generating the first data comprises generating the first data based at least in part on the second data and a second portion of the third data, the second portion differing from the first portion.

13. A system, comprising:
one or more processors; and
non-transitory computer-readable media storing computer-executable instructions that, when executed by the one or more processors, cause the one or more processors to perform operations comprising:
generating first data representing a difference value between second data indicating a first encoded value generated by a first system and third data indicating a second encoded value generated by a second system, wherein the difference value is generated by comparing the first encoded value and the second encoded value, and wherein:
the second data represents first device identifier information stored by the first system for first devices associated with user account data; and
the third data represents second device identifier information stored by the second system and that the second system has reported as being associated with the user account data;
determining fourth data corresponding to historical difference values over a period of time, wherein the historical difference values indicate historical differences in prior device identifier information stored by the first system and prior device identifier information stored by the second system;
determining, based at least in part on the first data and the fourth data, a trend in difference values associated with the second system, the trend indicating an increase in anomalies detected as between the second data as stored by the first system and the third data as stored by the second system; and
based at least in part on the trend, determining to perform an action associated with the anomalies.

14. The system of claim 13, the operations further comprising:
determining, based at least in part on the historical difference values, a threshold difference value to associate with the second system;
determining that the difference value satisfies the threshold difference value;
determining that one or more of the historical difference values satisfy the threshold difference value; and
wherein the trend is determined based at least in part on the difference value and the one or more of the historical difference values satisfying the threshold difference value.

15. The system of claim 13, the operations further comprising:
determining that the third data includes a type of device identifier, the type being one of multiple types of device identifiers stored in a database associated with the user account data; and
selecting the second data from the database based at least in part on the first data being associated with the type of device identifier.

16. The system of claim 13, the operations further comprising:
generating fifth data representing detected anomalies after performing the action;
determining that the fifth data indicates a decrease in the detected anomalies; and
determining to refrain from performing an additional action to mitigate the anomalies based at least in part on the fifth data indicating the decrease in the detected anomalies.

17. The system of claim 13, wherein device identifier information is received from the second system at a first rate, and the operations further comprise:
determining that the historical difference values satisfy a threshold difference value; and
querying the second system at a second rate instead of the first rate based at least in part on the historical difference values satisfying the threshold difference value, the second rate differing from the first rate.

18. The system of claim 13, the operations further comprising:

receiving fifth data from the second system indicating a cause of the trend;

determining that the cause of the trend corresponds to at least one of multiple causes predetermined to be a false positive anomaly; and determining a threshold difference value to associate with the second system for performing subsequent mitigating actions, the threshold difference value determined utilizing the first data.

19. The system of claim 13, the operations further comprising:

generating a first hash value utilizing the second data;

generating a second hash value utilizing the third data; and wherein generating the first data comprises generating the first data based at least in part on the first hash value and the second hash value.

20. The system of claim 13, the operations further comprising:

receiving, from a user device having installed thereon an application associated with the second system, request data to associate a newly-added device with the user account data;

querying the second system for the third data in response to receiving the request data;

identifying a first portion of the third data associated with the newly-added device; and wherein generating the first data comprises generating the first data based at least in part on the second data and a second portion of the third data, the second portion differing from the first portion.

\* \* \* \* \*